US011475003B1

(12) United States Patent
Shackell

(10) Patent No.: US 11,475,003 B1
(45) Date of Patent: *Oct. 18, 2022

(54) METHOD AND SYSTEM FOR SERVICING QUERY REQUESTS USING DATASPACES

(71) Applicant: Anaplan, Inc., San Francisco, CA (US)

(72) Inventor: Thomas Francis Shackell, Leeds (GB)

(73) Assignee: Anaplan, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,597

(22) Filed: Oct. 31, 2018

(51) Int. Cl.
  G06F 16/27 (2019.01)
  G06F 16/2453 (2019.01)
  G06F 16/2455 (2019.01)

(52) U.S. Cl.
  CPC .. G06F 16/24539 (2019.01); G06F 16/24552 (2019.01); G06F 16/27 (2019.01)

(58) Field of Classification Search
  CPC ... G06F 16/24539–24552; G06F 16/27; G06F 16/24552
  USPC ......................................................... 707/717
  See application file for complete search history.

(56) References Cited

U.S. PATENT DOCUMENTS

| | | | |
|---|---|---|---|
| 6,212,515 B1 * | 4/2001 | Rogers | G06F 16/24539 |
| 6,381,605 B1 * | 4/2002 | Kothuri | G06F 16/2264 |
| 6,920,454 B1 | 7/2005 | Chan | |
| 7,293,254 B2 | 11/2007 | Bloesch et al. | |
| 7,877,376 B2 * | 1/2011 | Thiyagarajan | G06F 16/24539 |
| | | | 707/717 |
| 7,941,408 B2 * | 5/2011 | Sinha | G06F 16/219 |
| | | | 707/685 |
| 8,151,056 B2 * | 4/2012 | Gould | G06Q 10/0631 |
| | | | 711/129 |
| 8,589,445 B2 * | 11/2013 | Gould | G06Q 10/04 |
| | | | 707/795 |
| 9,411,853 B1 | 8/2016 | Dovrtel et al. | |
| 9,529,892 B2 * | 12/2016 | Tibrewal | G06F 3/04815 |
| 9,552,242 B1 * | 1/2017 | Leshinsky | G06F 11/0709 |
| 9,710,501 B2 * | 7/2017 | Walker | G06F 16/219 |
| 10,298,661 B2 | 5/2019 | Harries | |
| 10,467,245 B2 * | 11/2019 | Sirer | G06F 16/22 |

(Continued)

OTHER PUBLICATIONS

International Search Report and Written Opinion issued in corresponding application No. PCTUS2019059235, dated Feb. 4, 2020. (15 pages).

(Continued)

*Primary Examiner* — Ashish Thomas
*Assistant Examiner* — Nargis Sultana
(74) *Attorney, Agent, or Firm* — Chamberlain, Hrdlicka, White, Williams & Aughtry

(57) ABSTRACT

In general, the invention relates to a method for servicing query requests in distributed systems. The method includes making a first determination by a query node that it is associated with a dataspace, making a second determination that data associated with a first input sub-region is not present on the query node, where the first input sub-region is associated with the dataspace. Based on the first determination and the second determination, the method includes obtaining data for the entire dataspace from persistent storage, associating at least a portion of the obtained data with the first input sub-region to obtain a populated first input sub-region, and servicing a query request using the populated first input sub-region.

15 Claims, 19 Drawing Sheets

(56) References Cited

U.S. PATENT DOCUMENTS

| | | | |
|---|---|---|---|
| 10,929,428 B1* | 2/2021 | Brahmadesam | G06F 16/2379 |
| 11,016,947 B1* | 5/2021 | Patel | G06F 16/27 |
| 2003/0009458 A1* | 1/2003 | Nakano | G06F 16/00 |
| 2003/0009551 A1 | 1/2003 | Benfield et al. | |
| 2003/0009552 A1 | 1/2003 | Benfield et al. | |
| 2004/0210608 A1* | 10/2004 | Lee | G06F 11/1448 |
| 2005/0120062 A1* | 6/2005 | Sinha | G06F 16/219 |
| | | | 707/999.203 |
| 2006/0184519 A1* | 8/2006 | Smartt | G06F 16/29 |
| 2009/0249290 A1 | 10/2009 | Jenkins | |
| 2010/0100571 A1 | 4/2010 | Gould | |
| 2010/0131715 A1 | 5/2010 | Gould | |
| 2011/0047146 A1 | 2/2011 | Scott | |
| 2011/0264679 A1* | 10/2011 | Dertinger | G06F 16/2471 |
| | | | 707/765 |
| 2011/0293096 A1* | 12/2011 | Reilly | H04L 9/0894 |
| | | | 380/277 |
| 2012/0030293 A1 | 2/2012 | Bobotek | |
| 2012/0198198 A1* | 8/2012 | Gould | G06F 16/283 |
| | | | 711/170 |
| 2012/0290700 A1* | 11/2012 | Li | H04L 61/2007 |
| | | | 709/223 |
| 2013/0110911 A1 | 5/2013 | Chow | |
| 2013/0117257 A1 | 5/2013 | Meijer | |
| 2013/0311422 A1* | 11/2013 | Walker | G06F 16/219 |
| | | | 707/609 |
| 2014/0032504 A1* | 1/2014 | Golab | G06F 16/2365 |
| | | | 707/690 |
| 2014/0156638 A1* | 6/2014 | Joshi | G06F 16/256 |
| | | | 707/722 |
| 2014/0180653 A1* | 6/2014 | Belmans | G06F 30/20 |
| | | | 703/2 |
| 2014/0215019 A1* | 7/2014 | Ahrens | G06F 16/9574 |
| | | | 709/219 |
| 2014/0229470 A1 | 8/2014 | Smith-mickelson et al. | |
| 2014/0279920 A1* | 9/2014 | Madhavarapu | G06F 16/2365 |
| | | | 707/649 |
| 2014/0304339 A1 | 10/2014 | Hamilton | |
| 2014/0365523 A1* | 12/2014 | Wagner | G06F 16/435 |
| | | | 707/770 |
| 2015/0012539 A1* | 1/2015 | McHugh | G06F 16/2255 |
| | | | 707/737 |
| 2015/0058324 A1 | 2/2015 | Kauwe | |
| 2015/0067556 A1 | 3/2015 | Tibrewal | |
| 2015/0100574 A1 | 4/2015 | Presta et al. | |
| 2015/0149570 A1* | 5/2015 | Harries | H04L 67/10 |
| | | | 709/206 |
| 2015/0347450 A1* | 12/2015 | Phelan | G06F 9/541 |
| | | | 707/825 |
| 2016/0019275 A1* | 1/2016 | Mosko | H04L 65/4084 |
| | | | 707/610 |
| 2016/0050269 A1* | 2/2016 | Botticelli | H04L 67/12 |
| | | | 709/218 |
| 2016/0085809 A1* | 3/2016 | de Castro Alves | |
| | | | G06F 16/2282 |
| | | | 707/736 |
| 2016/0124857 A1* | 5/2016 | Parr | G06F 16/24561 |
| | | | 711/137 |
| 2016/0217519 A1 | 7/2016 | Kozat et al. | |
| 2016/0255139 A1 | 9/2016 | Rathod | |
| 2016/0321376 A1 | 11/2016 | Taylor | |
| 2016/0350363 A1* | 12/2016 | Raja | G06F 3/065 |
| 2017/0012815 A1* | 1/2017 | Nekrestyanov | H04L 67/02 |
| 2017/0024912 A1* | 1/2017 | de Castro Alves | |
| | | | G06F 16/24568 |
| 2017/0255524 A1* | 9/2017 | McGrath | G06F 16/9566 |
| 2017/0364699 A1* | 12/2017 | Goldfarb | H04L 9/3239 |
| 2018/0088788 A1* | 3/2018 | Cheung | G06F 3/04855 |
| 2018/0173767 A1 | 6/2018 | Langseth et al. | |
| 2018/0232422 A1 | 8/2018 | Park | |
| 2018/0246926 A1 | 8/2018 | Altaf | |
| 2018/0260409 A1* | 9/2018 | Sundar | G06F 16/148 |
| 2018/0300350 A1* | 10/2018 | Mainau | G06F 16/9027 |
| 2019/0147078 A1 | 5/2019 | Dageville | |
| 2019/0236130 A1 | 8/2019 | Li et al. | |
| 2019/0236215 A1 | 8/2019 | Agarwal et al. | |
| 2019/0294724 A1* | 9/2019 | Michelis | G06F 16/24542 |
| 2019/0325737 A1 | 10/2019 | Moustafa et al. | |
| 2020/0104181 A1 | 4/2020 | Pyati et al. | |
| 2020/0104362 A1 | 4/2020 | Yang et al. | |
| 2020/0151577 A1* | 5/2020 | Ogawa | G06N 5/046 |
| 2021/0011914 A1 | 1/2021 | Pearson et al. | |

OTHER PUBLICATIONS

Lars George, HBase: The Definitive Guide, HBase: The Definitive Guide, Sep. 23, 2011, 1-524, ISBN 978-1-44 93-9610-7, O'Reilly Media, Incorporated, Sebastopol, XP055662278 (115 pages).

Silu Huang et al, OrpheusDB: Bolt-on Versioning for Relational Databases, OrpheusDB: Bolt-on Versioning for Relational Databases, Mar. 7, 2017, rxiv.org, Cornell University Library, 2010 Lin Library Cornell University Ithaca, NY 14853, DOI: 10.14778/3115404.3115417, Cornell University Library, 2010 Lin Library Cornell University, NY 14853 (63 pages).

International Search Report and Written Opinion dated Dec. 8, 2020, for PCT/US2020/054157 filed on Oct. 2, 2020.

\* cited by examiner

| Population Table Dataspace D – Sharding A | | |
|---|---|---|
| Sub-Region ID | First Populated | Most Recent |
| Sub-Region $D_1$ ID | 5 | 6 |
| Sub-Region $D_2$ ID | 3 | 3 |
| Sub-Region $D_3$ ID | 1 | 6 |
| Sub-Region $D_4$ ID | 2 | 3 |

FIG. 4F

| Sub-Region ID | First Populated | Most Recent |
|---|---|---|
| Sub-Region $E_1$ ID | 4 | 6 |
| Sub-Region $E_2$ ID | 1 | 10 |
| Sub-Region $E_3$ ID | 3 | 3 |
| Sub-Region $E_4$ ID | 11 | 11 |

Population Table Dataspace E – Sharding A

FIG. 4G

METHOD AND SYSTEM FOR SERVICING QUERY REQUESTS USING DATASPACES

BACKGROUND

Companies collect large amounts of data about their own operations. This data is then analyzed to determine, among other things, how to improve the operation of the company and/or how to plan for the future operation of the company. The traditional approach to efficiently analyzing data (or data sets) is to load the data (or data sets) into memory and then analyze the in-memory data. As the size of data sets that need to be analyzed has grown, the traditional approach has become impractical or at a minimum cost prohibitive. Specifically, in order to keep all of the data in memory, a larger amount of memory needs to be provisioned and additional overhead needs to be expended in order to ensure that the data in the memory is current. Further, as the size of the data set increases, it is difficult to efficiently and effectively scale the hardware and software infrastructure necessary to analyze the larger data set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4A-4G shows an example in accordance with one or more embodiments of the invention.

SUMMARY

Figure 1A:
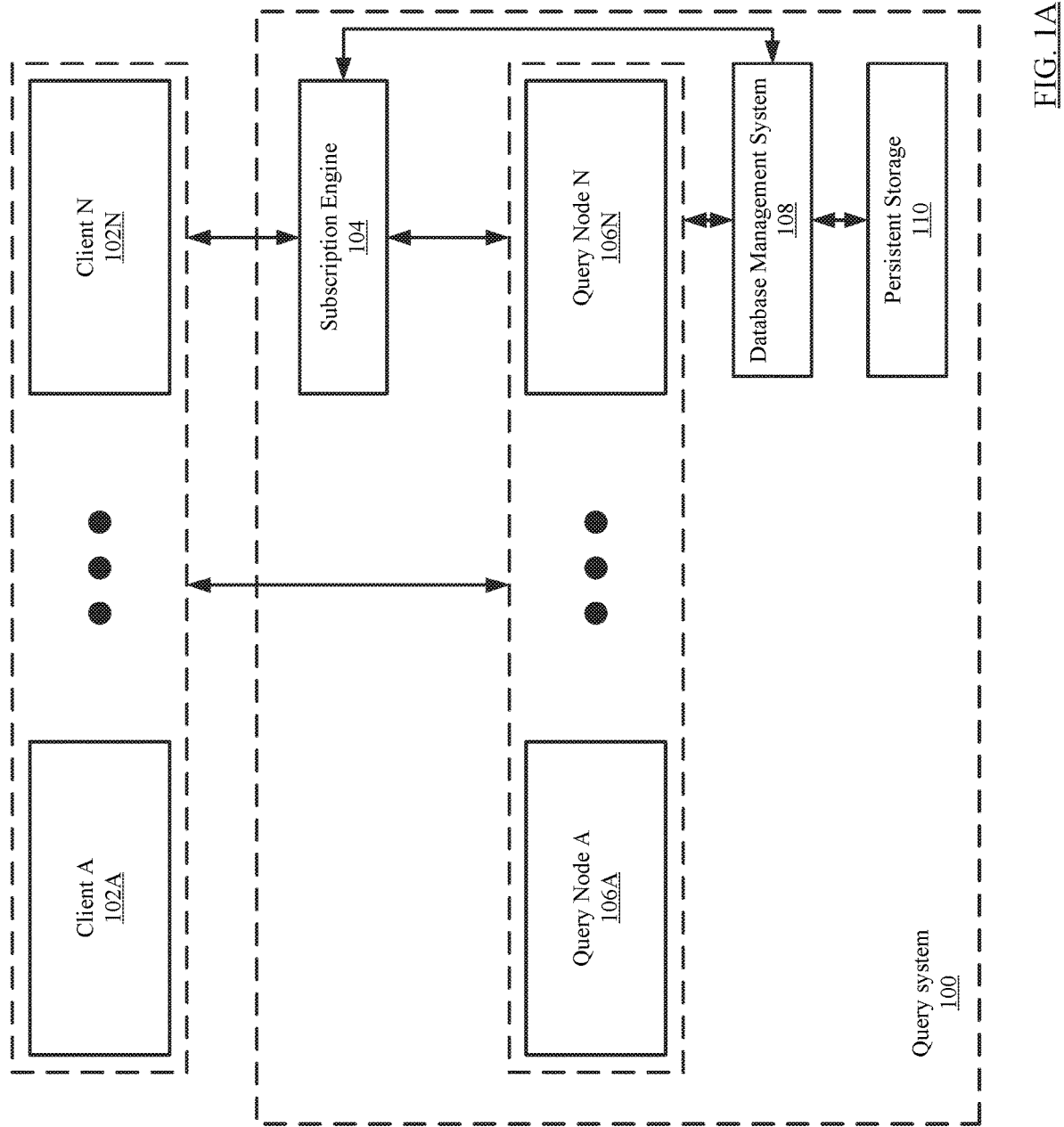
FIG. 1A shows a diagram of a system in accordance with one or more embodiments of the invention.

In general, in one aspect, the invention relates to a method for servicing query requests. The method includes making a first determination by a query node that it is associated with a dataspace, making a second determination that data associated with a first input sub-region is not present on the query node, wherein the first input sub-region is associated with the dataspace, based on the first determination and the second determination, obtaining data for the entire dataspace from persistent storage, associating at least a portion of the obtained data with the first input sub-region to obtain a populated first input sub-region, and servicing a query request using the populated first input sub-region In general, in one aspect, the invention relates to non-transitory computer readable medium comprising computer readable program code, which when executed by a computer processor enables the computer processor to perform a method for servicing query requests, the method comprising making a first determination by a query node that it is associated with a dataspace, wherein making the first determination comprises using a distribution key and a node distribution key list to identify the query node as being associated with the dataspace, wherein the distribution key is a value generated using consistent hashing and a dataspace identifier for the dataspace, making a second determination that data associated with a first input sub-region is not present on the query node, wherein the first input sub-region is associated with the dataspace, based on the first determination and the second determination, obtaining data for the entire dataspace from persistent storage, associating at least a portion of the obtained data with the first input sub-region to obtain a populated first input sub-region, and servicing a query request using the populated first input sub-region.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing distributed calculations. More specifically, embodiments of the invention relate to distributing management of dataspaces across query nodes and also distributing the servicing of a query request across one or more query nodes.

FIG. 1A shows a diagram of a system in accordance with one or more embodiments of the invention. The system includes a query system (100) interacting with one or more clients (102A, 102N). The components illustrated in FIG. 1A may be connected via any number of operable connections supported by any combination of wired and/or wireless networks. Each component of the system of FIG. 1A (including the individual components in the query system) may be operably connected via any combination of wired and/or wireless connections. Each component of the system of FIG. 1A is discussed below.

In one embodiment of the invention, clients (102A, 120N) are configured to issue query request to the query system (or to a specific query node in the query system), to receive query responses, and to interact with the subscription engine (described below).

In one or more embodiments of the invention, zero, one or more clients (102A, 102N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more clients (102A, 102N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

In one or more embodiments of the invention, query system (100) includes one or more query nodes (106A, 106N), a database management system (DBMS) (108), persistent storage (110), and a subscription engine (104). Each of these components is described below.

Figure 1B:
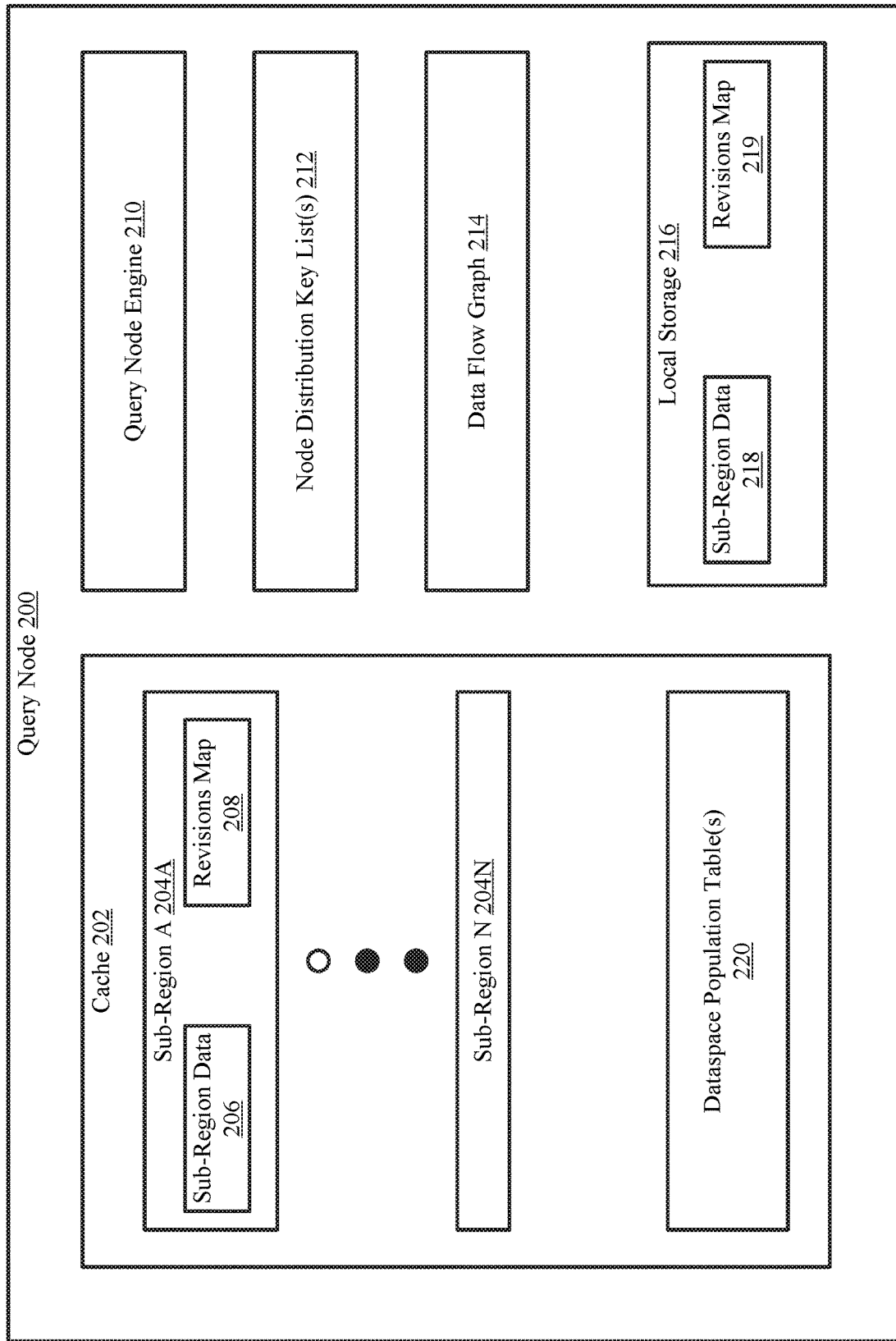
FIG. 1B shows a diagram of a query node in accordance with one or more embodiments of the invention.
Figure 1C:
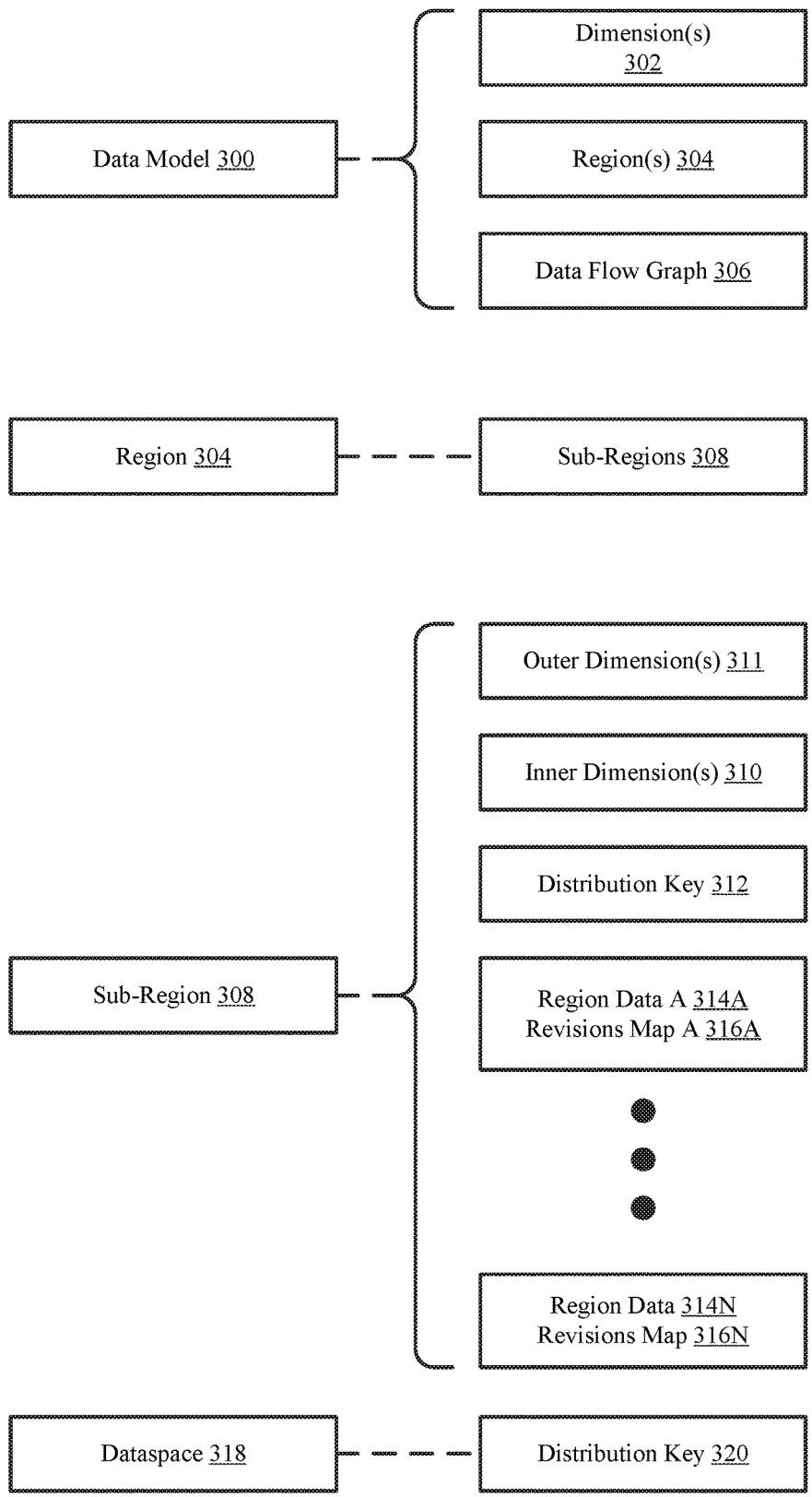
FIG. 1C shows relationships between various elements in the system in accordance with one or more embodiments of the invention.
Figure 2:
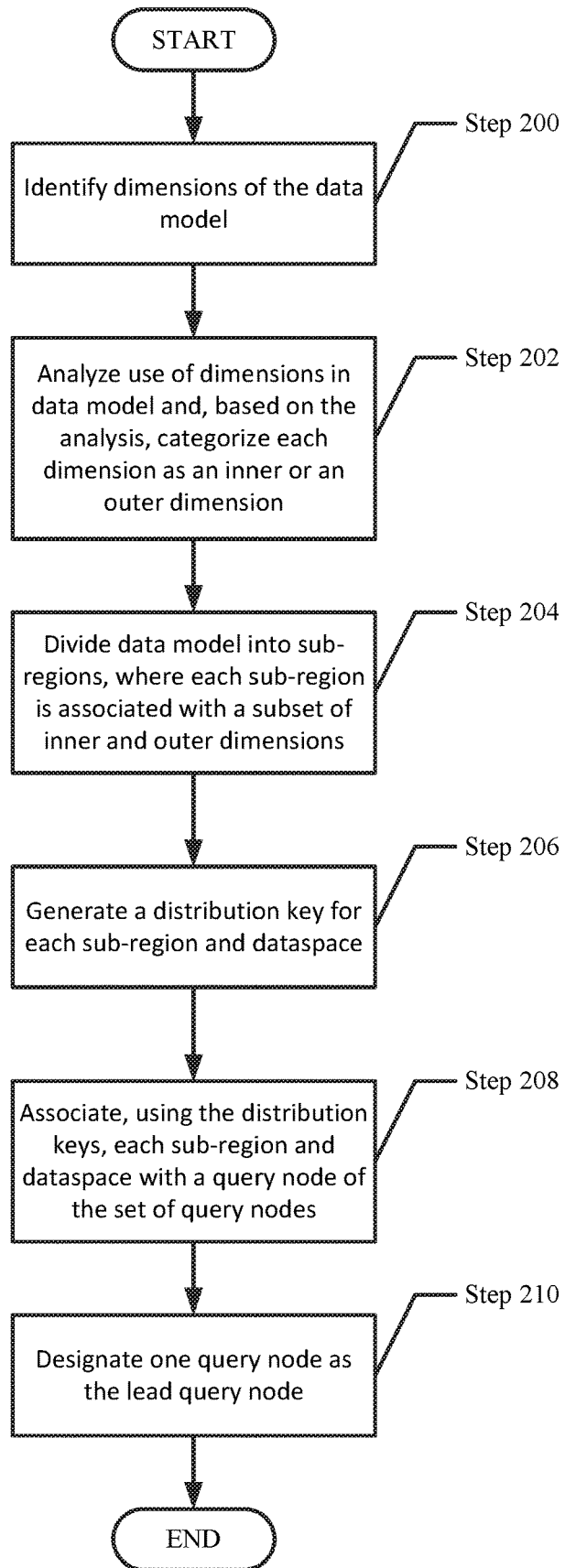
FIG. 2 shows a flowchart of a method of configuring the system in accordance with one or more embodiments of the invention.

In one or more embodiments of the invention, each query node (106A, 106N) may be configured to perform all or a portion of the method shown in FIG. 2 in order to configure the query system to service query requested. Further, each query node (106A, 106N) may also be configured to service query requests that may originate from a client (102A, 102N), from the subscription engine (104), and/or for another query node (106A, 106N). Servicing the query requests by the query nodes may be performed recursively in accordance with FIGS. 3A-3G. In addition, each of the query nodes may include functionality to be designated as the lead query node and, when it is designated as such, manage the distribution of sub-regions and dataspaces among the query nodes. Additional detail about the distribution of sub-regions and dataspaces is provided below in, e.g., FIGS. 1B, 1C, and 2.

In one or more embodiments of the invention, zero, one or more query nodes (106A, 106N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more query nodes (106A, 106N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

Additional details about the query nodes are provided in FIGS. 1B and 2-3G below.

In one embodiment of the invention, the database management system (DBMS) (108) provides an interface between other components of the query system (e.g., the query nodes, and the subscription engine) and the persistent storage. More specifically, DBMS (108) is configured to receive requests for data stored in the persistent storage, retrieve the requested data from the persistent storage, and provide the retrieved data to the requesting entity (e.g., a query node). In various embodiments of the invention, the DBMS is also configured to store data (which may be user data or derived data) in the persistent storage and, in certain scenarios, issue notifications to the subscription engine (104) when particular user data is stored in the persistent storage or a request is made to store user data in the persistent storage (additional detail described below). The DBMS (108) may be implemented using any protocol currently known or later developed. Those skilled in the art will appreciate that management software, other than a DBMS may be used without departing from the invention. In one embodiment of the invention, the DBMS may be implemented on a computing device (see e.g., FIG. 5) or as a logical device (e.g., a virtual machine, a container, etc.).

In one embodiment of the invention, the persistent storage (110) includes any form of non-volatile storage media that may store data (e.g., user data and derived data). Examples of persistent storage may include, but are not limited to, magnetic storage, optical storage, solid state memory, or any combination thereof. In one embodiment of the invention, the data stored in persistent storage may be user data and derived data. Depending on the implementation of the invention, the persistent storage may store the user data and not store the derived data.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

Each piece of user data stored in the persistent storage is associated with a dataspace. The dataspace is associated any number of dimensions and, as such, may be referred to as an N-dimensional dataspace. The dataspace may be associated with multiple versions of the data. The initial version of a piece of data in the dataspace is, e.g., one, and each time there is any change to the user data (e.g., an addition, deletion, or modification), then an updated copy of the user data is stored and the version associated with the updated copy of the user data is incremented (or updated). In this manner, the persistent storage may include multiple copies of a particular piece of user data or particular user data sub-region each associated with their own version number.

In another embodiment of the invention, a version associated with user data may be associated with a particular period of time (e.g., when the data was entered or changed). Further, the versioning may be implemented across all dataspaces in the query system instead of on a per-dataspace basis. For example, consider a scenario in which there are two dataspaces, A and B. At time (T)=1, data is added to dataspace A but no data is added to dataspace B. At T=2, data is added to dataspace B but the data dataspace A is not changed. At T=3, data in both dataspace A and B is changed.

If versioning is performed across multiple dataspaces using periods of time, then at T=1, that data in dataspace A is version 1 data, and the data in dataspace B is at version 0 because there is no data stored in dataspace B. At T=2, the data in dataspace A remains at version 1 and the data in dataspace B is associated with version 2, because the data in dataspace B was added during the second time period (i.e., T=2). At T=3, the dataspace A has two versions of data, namely, version 1 and version 3. Further, at T=3 dataspace B has two versions of data, namely, version 2 and version 3. The example is not intended to limit the scope of the invention.

In one embodiment of the invention, the persistent storage may store derived data. Further, the persistent storage may include multiple versions of derived data. In such scenarios, the version (which may be represented as a number) of the derived data corresponds to the version(s) of the user data that was used to generate (directly or indirectly) the derived data or derived data sub-region. The version or versions of user data from which the derived data is directly or indirectly derived may be referred to as a revisions map. In this manner, the persistent storage may include multiple copies of derived data each associated with their own version number and/or revisions map. For example, consider a scenario in which, at a first time, derived data (DD1) is calculated using user data A version 1 (UDAv1) and user data B version 2 (UDBv2). Accordingly, the persistent storage stores DD1 along with the following revisions map: [UDAv1, USBv2]. At a second point in time, user data B is updated resulting user data B version 3 being stored in the persistent storage. At a third point in time, the derived data is recalculated (e.g., in response to a query request) the resulting derived data (DD2) may be stored in persistent storage along with the following revisions map: [UDAv1, UDv3]. The example is not intended to limit the scope of the invention.

Continuing with the discussion of FIG. 1A, in one embodiment of the invention, the subscription engine (104) is configured to receive requests from the clients (102A, 102B) to issue query requests when there is a change to the user data associated with the query request. More specifically, each query request is associated target sub-region (e.g., the specific data that is responsive the query request) and each target sub-region is associated (directly or indirectly) with user data. When there is a change to such user data, the subscription engine may initiate the corresponding query request. For each query request that the subscription engine is monitoring, the subscription engine monitors the user data associated with the query request. In one or more embodiments of the invention, monitoring the user data may include receiving a notification from the DBMS (108) each time any user data has changed. In such scenarios, the subscription engine may process each notification to determine whether the user data that has change is associated with any of the query requests that it is monitoring. If user data is associated with one or more query requests, then the subscription engine either: (i) issues the query request to the query system (e.g., to a query node), receives a query result and then provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In another scenario, the subscription engine (104) may, for each query request it is monitoring, specify to the DBMS (108) which user data sub-regions (i.e., sub-regions with user data) to monitor. In this scenario, the DBMS may only notify the subscription engine of user data changes to the user data sub-regions specified by the subscription engine. When a notification is received by the DBMS (108), the subscription engine may be process each notification to determine associated query request(s). Once the associated query request(s) is identified, then the subscription engine either: (i) issues the query request to the query system (e.g., to a query node), receives a query result, and provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In one embodiment of the invention, the subscription engine (104) may also be configured to monitor changes (i.e., additions, deletions, modifications) to user data within one or more dataspaces, then send the changes (which may be new versions of the user data) to the query node that is managing the dataspace. The query nodes, upon receipt of the changes, may update the appropriate population table and/or locally store (in persistent storage or in the cache) the changes (see e.g., FIG. 3D-3G).

In one embodiment of the invention, the subscription engine may be implemented on a computing device (see e.g., FIG. 5) or as a logical device (e.g., a virtual machine, a container, etc.).

FIG. 1B shows a diagram of a query node in accordance with one or more embodiments of the invention. In one embodiment of the invention, the query node (200) includes a cache (202), a query node engine (210), a node distribution key list(s) (212), a data flow graph (214), and local storage (216). Each of these components is described below.

In one embodiment of the invention, the cache (202) is volatile memory (e.g., random access memory) that stores data associated with one or more sub-regions (204A, 204N). More specifically, data stored in the cache that is associated with a sub-region (i.e., sub-region data (206)) may be user data or derived data. Further, the sub-region data (206) is associated with a revisions map (208). More specifically, each piece of data (user data or derived data) is associated with a sub-region and a revisions map (208) (or a relevant portion thereof, see e.g., FIGS. 4A-C) (as described above in FIG. 1A). Accordingly, for a given piece of data or sub-region, there may be multiple different versions each associated with their own unique revisions map. Additional detail about sub-regions is provided below in FIG. 1C. The manner in which data is stored in the cache and the manner in which data is removed and/or added to the cache may vary based on the implementation of the invention. Further, the mechanism used to manage a cache on a given query node may be the same or different than the mechanism used to manage the cache on a different query node. Moreover, the caching used in the query system does not require the caches on the query nodes to be consistent and/or coherent.

In one embodiment of the invention, the cache (202) stores one or more dataspace population tables (also referred to as population tables) (220). Each dataspace population table is associated with one dataspace that has been sharded, or divided, into a specific set of sub-regions. Accordingly, if a dataspace has been sharded into different sets of sub-regions, then the cache may include multiple dataspace population tables for the same dataspace. Further, because a query node may be associated with (or manage) multiple dataspaces, it may include dataspace population tables.

As discussed above, a given dataspace may be sharded into sub-regions. Further, because the dataspaces are N-dimensional dataspace (where N>0), a given dataspace may sharded in different ways. The following is a non-limiting example of a dataspace that is sharded two different ways. Turning to the example, consider a scenario in which the dataspace corresponds the sale of Product A from January 2015-December 2025 across the following geographic locations: North America, South America, Europe, Asia, Africa, and Australia. One possible sharding of this dataspace is per-region. This results in six sub-regions: North America, South America, Europe, Asia, Africa, and Australia, where each of the sub-regions only includes data for the geographic location from January 2015-December 2025. Another possible sharding of this dataspace is per year. This results in 11 sub-regions: 2015, 2016, 2017, 2018, 2018, 2020, 2021, 2022, 2023, 2024, 2025, 2025, where each of the sub-regions includes data across all geographic locations but only for the specified year. In addition to the two possible shardings of the dataspace, the dataspace could also be sharded across both region and year resulting in 66 sub-regions or neither per-region nor per-year resulting one sub-region.

In one embodiment of the invention, each dataspace population table specifies the sub-regions of the data space (i.e., the sub-regions based on the specific sharding of the dataspace) and for each sub-region: (i) an indication that no data is associated with the sub-region; (ii) the first version of data stored in the sub-region, and (iii) the most recent version (or versions) of data stored in the sub-region. For example, the population table may store the three most recent versions of the data sub-region.

The following is a non-limiting example of a population table. Turning to the example, consider a scenario in which there is one dataspace with three sub-regions: A, B, and C. At time (T)=1, data is added to sub-region A but no data is added to sub-regions B or C. At T=2, data is added to sub-region B but no data is added to sub-regions A or C. At T=3, data in both sub-regions A and B is modified. Then at T=1, sub-region A has version 1 of data, and sub-regions B and C are at version 0 because there is no data stored in sub-regions B and C. At T=2, the data in sub-region A remains at version 1 and the data in sub-region B is associated with version 2, because the data in sub-region B was added during the second time period (i.e., T=2); however, sub-region C remains are version 0. At T=3, the sub-regions A and B each have a second version of data, namely, version 3.

Based on the above scenario, the population table for the dataspace would be as follows:

Population Table 1

| Sub-Region | First Populated | Most Recent Version |
| --- | --- | --- |
| A | 1 | 3 |
| B | 2 | 3 |
| C | 0 | 0 |

Figure 3A:
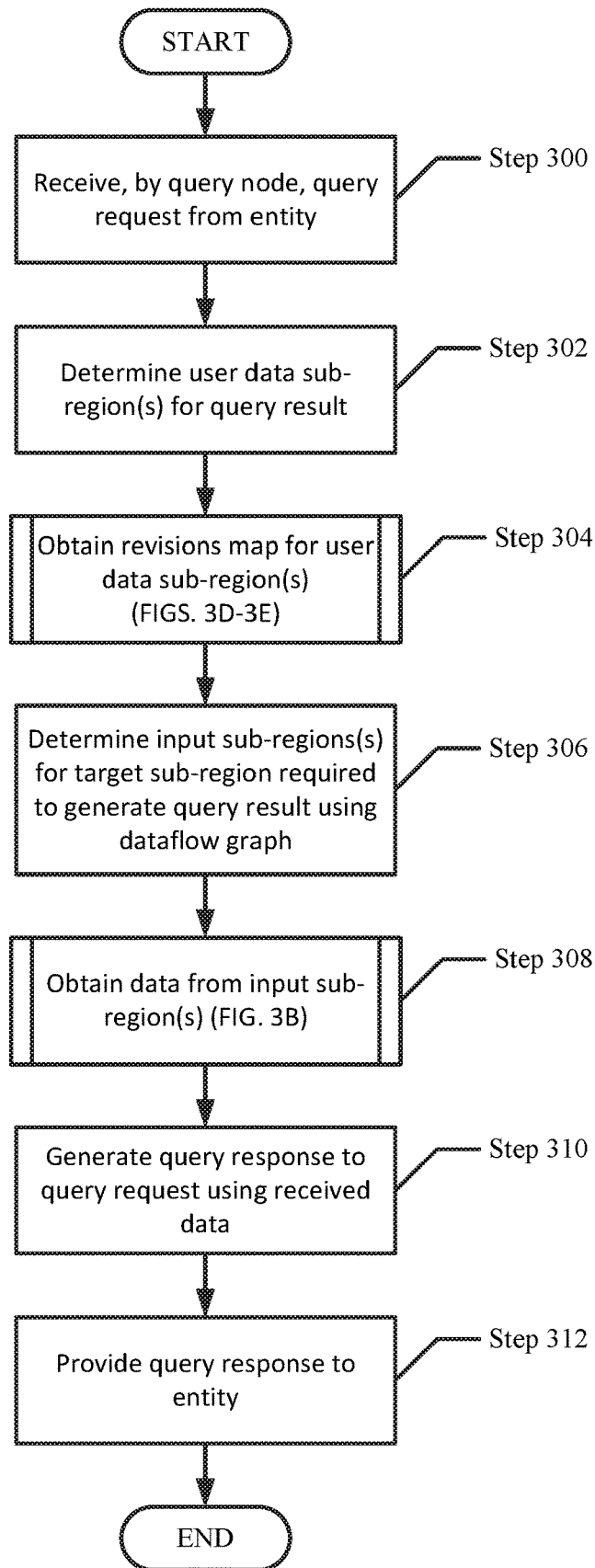
FIGS. 3A-3G show flowcharts for servicing a query request from a client in accordance with one or more embodiments of the invention.
Figure 3B:
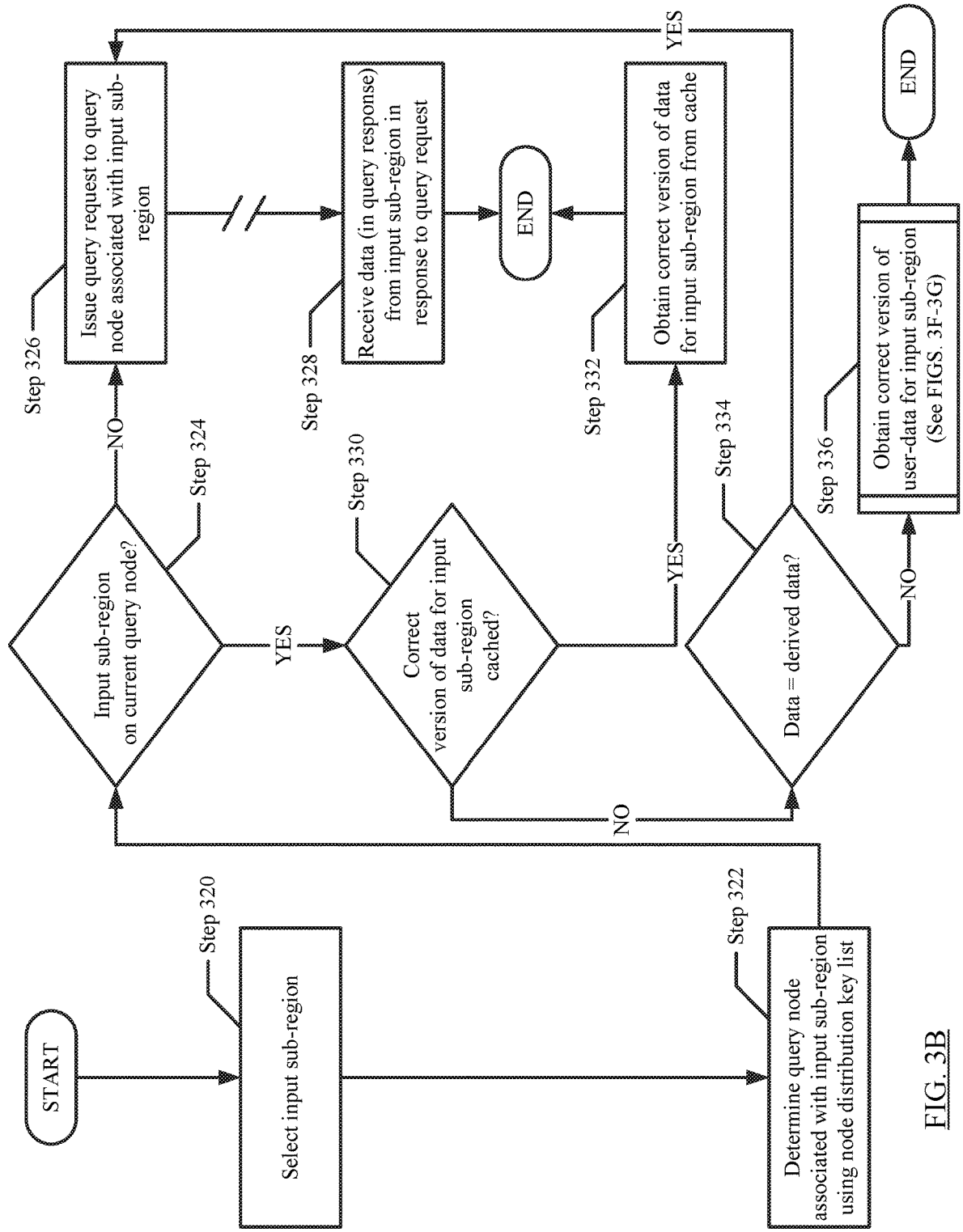
Figure 3C:
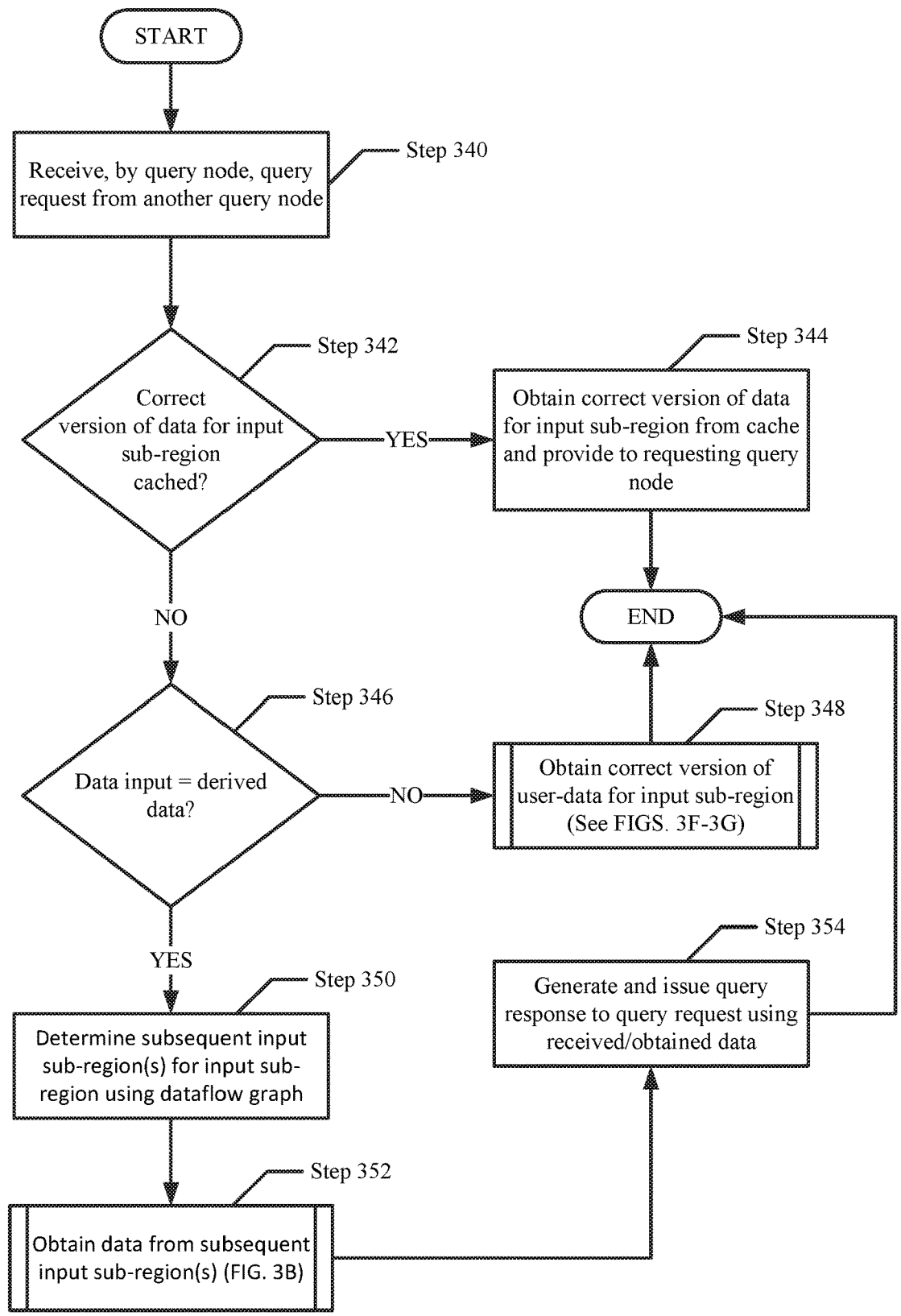
Figure 3D:
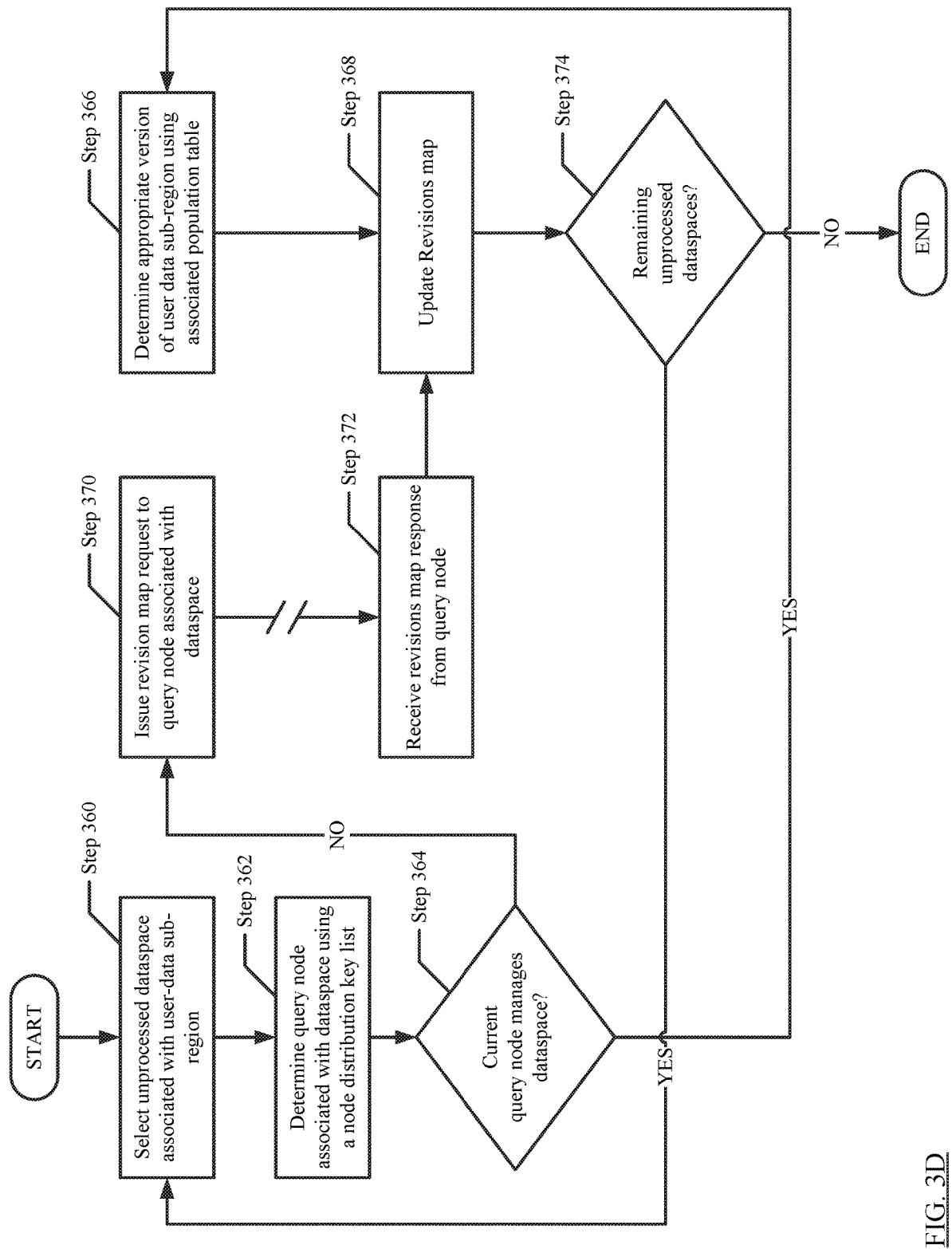
Figure 3E:
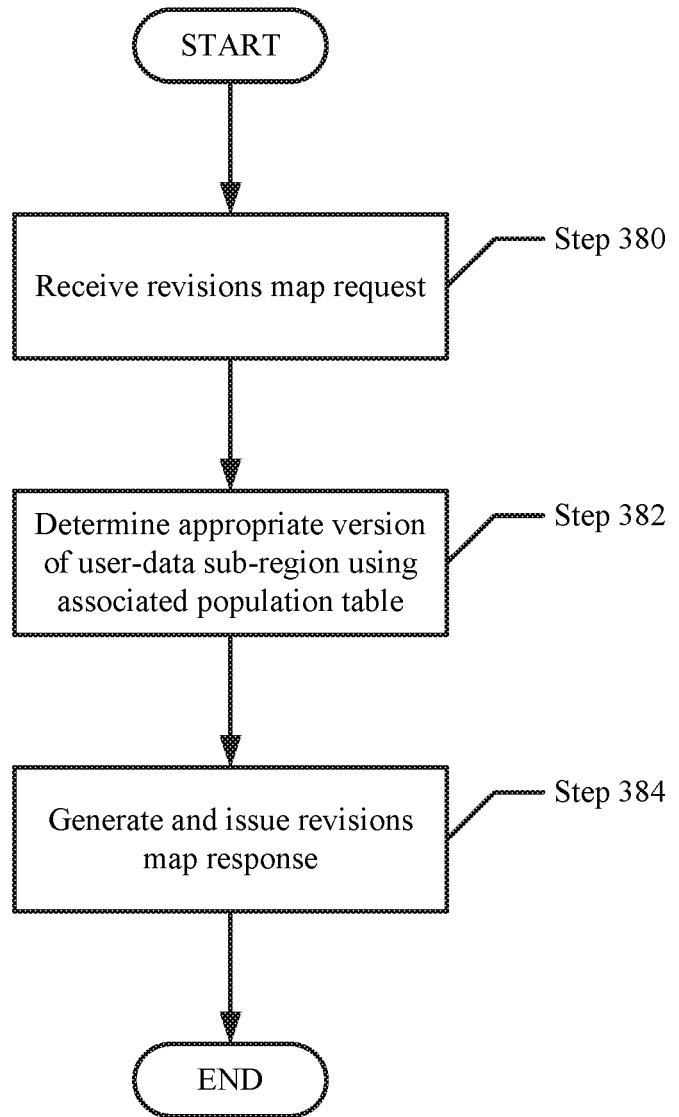
Figure 3F:
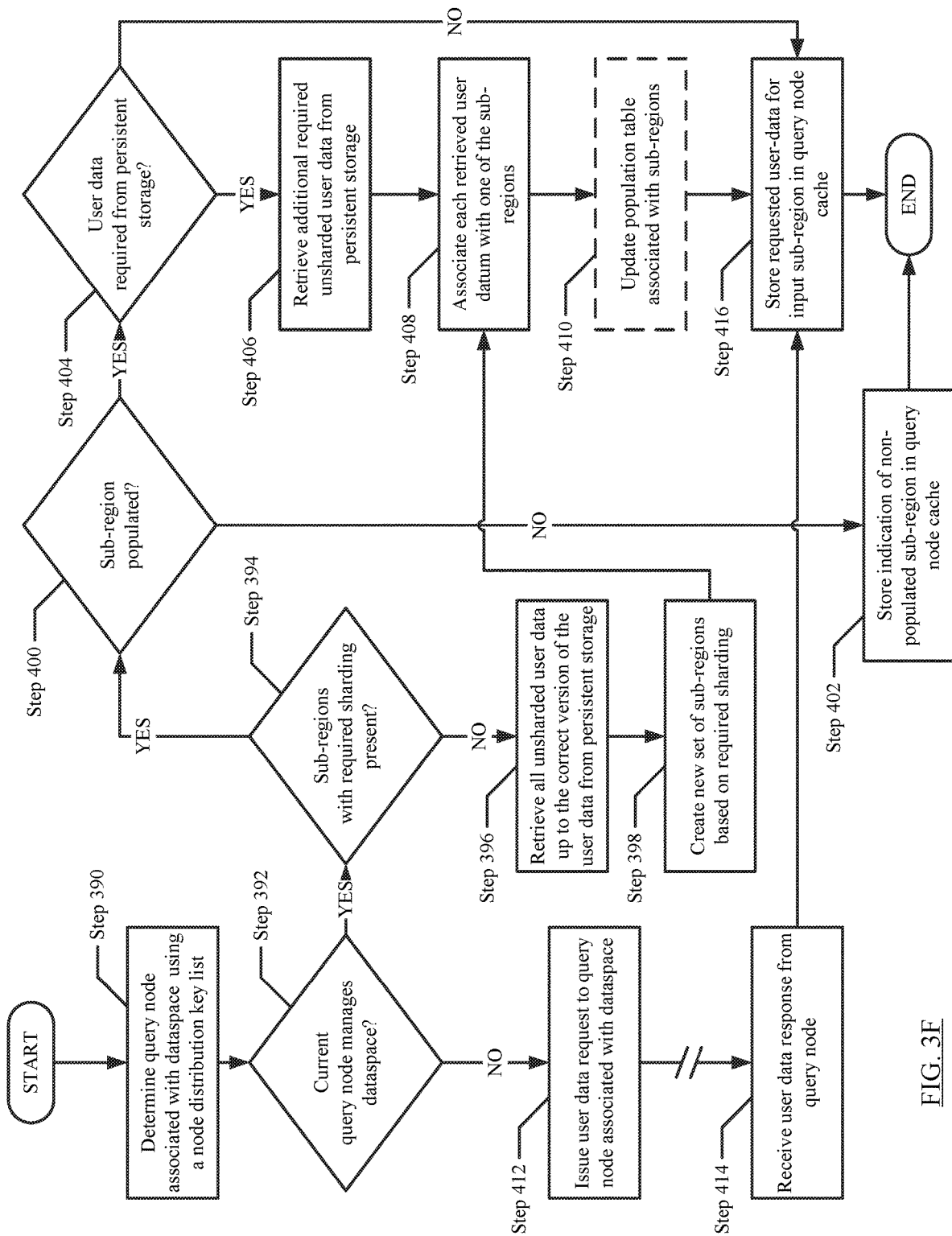
Figure 3G:
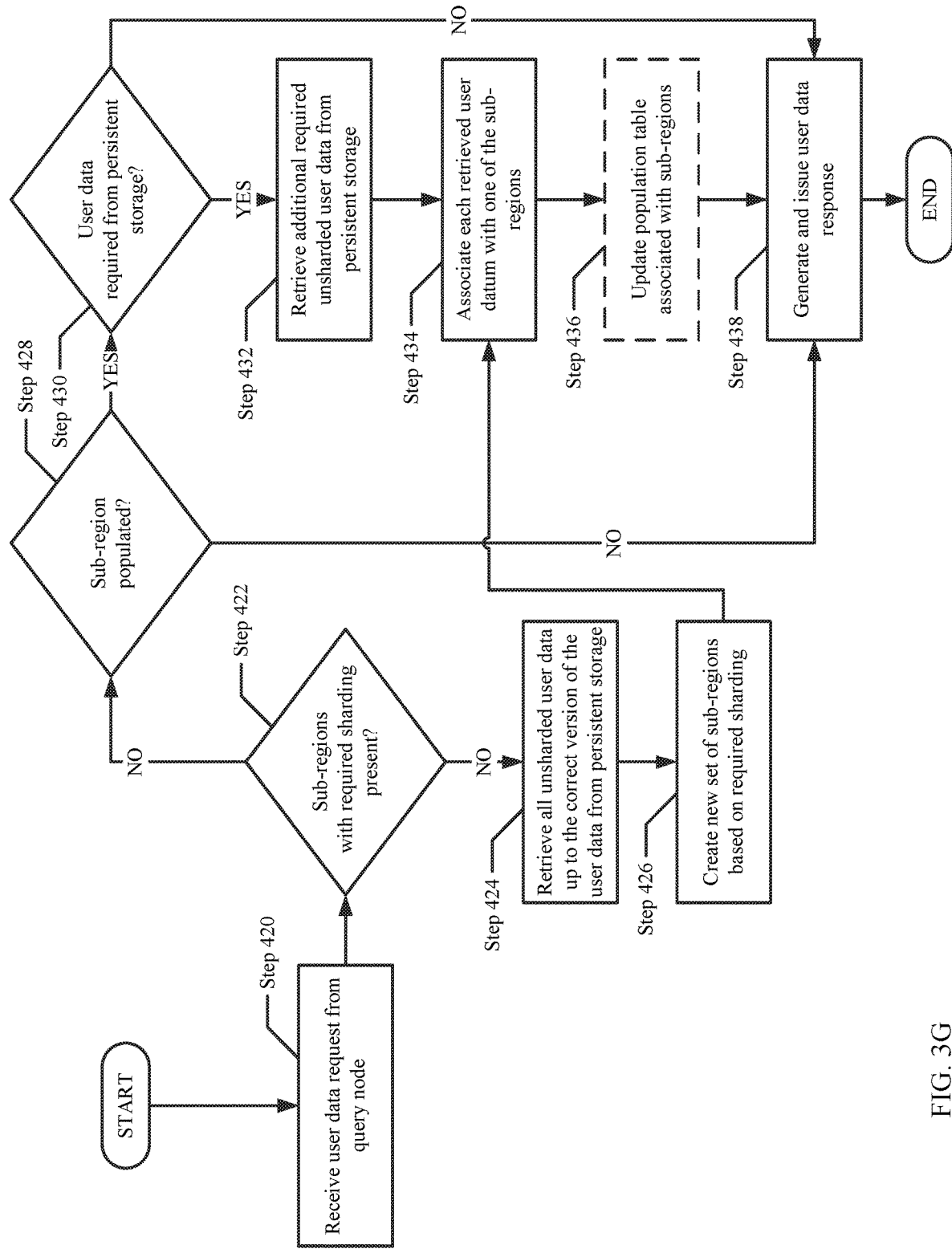

Continuing with the discussion, in one embodiment of the invention, the query node engine (210) is configured to perform all or a portion of the functionality described in FIGS. 2-3G.

In one embodiment of the invention, the node distribution key list(s) (212) specifies a list of node distribution keys associated with each query node in the query system. In one embodiment of the invention, there is a single node distribution key list, which specifies the query nodes that are associated with (or managing) each sub-region and each dataspace. In another embodiment of the invention, there is a node distribution key list that specifies the query nodes that are associated with (or managing) each sub-region and a second node distribution key list that specifies the query nodes that are associated with (or managing) each dataspace. The generation, operation, and use of the distribution key and the node distribution key list are described below with respect to FIGS. 2-3G.

In one embodiment of the invention, the local storage (216) on the query node (which may be persistent storage on the query node) includes sub-region data (218) and a corresponding revisions map (219) (which includes the version of user data). Unlike the sub-region data (206) stored in the cache (202), the sub-region data (218) stored in the local storage corresponds to user-data sub-regions (i.e., sub-regions that only include user data) associated with dataspaces that are managed by the query node. For example, referring to FIG. 4E, Query Node 3 manages dataspace E and, as such, may locally store data associated with dataspace E. The locally stored user data may be stored on per-sub-region basis (e.g., in sub-region $E_1$ $E_2$, $E_3$, or $E_4$). In one embodiment of the invention, the data associated with each sub-region is stored as a separate file (i.e., one file per-sub-region). In such scenarios, when additional data for the dataspace is obtained by the query node (e.g., Query Node 3), the additional data may be processed to determine to which sub-region it belong and then appended to the file corresponding to the appropriate sub-region. For example, if the additional data is associated with sub-region $E_2$, then the additional data is appended to the file associated with sub-region $E_2$.

Continuing with the discussion of FIG. 1B, in one embodiment of the invention, the data flow graph (214) specifies the relationships between the regions and/or sub-regions (where the specific granularity of the data flow graph may vary based on the implementation of the invention). More specifically, in one embodiment of the invention, the data is stored in the query system based on a data model. The data model may specify, among other information, what data is stored and the relationships between the stored data. Additional details about the data flow graph and the data model is described in FIG. 1C.

FIG. 1C shows relationships between various elements in the system in accordance with one or more embodiments of the invention.

As discussed above, the data is stored in the query system in accordance with a data model (300). In one embodiment of the invention, data is stored in cells, where each cell is associated one or more dimensions (302). The dimensions are specified by the data model (300) and define what specific data is stored within a given cell. Each of the cells is associated with a region (304), where the data model may specify multiple regions (304). Said another way, the data stored in accordance with the data model may be grouped into regions (304), where each region includes multiple cells. Further, the relationship between the regions (or sub-regions) is specified using a data flow graph (306). The data flow graph may specify whether a given cell includes user data or derived data. If a given cell includes derived data, the data flow graph may specify: (i) what user data and/or derived data are inputs to the particular cell (i.e., are input to generating the derived data of the cell) and (ii) the function (which may be mathematical function or algorithm) is used to combine the aforementioned inputs. An example of a data flow graph in shown in FIG. 4B.

Each region (304) may be divided into two or more sub-regions (308). In one embodiment of the invention, if the region (304) includes only user data, then the region (304) may be referred to as dataspace. Each sub-region for a given region may have the same outer dimension(s) but different inner dimensions. For example, consider a scenario in which a given region is associated with a time dimension (specified as months of the year) and a geographic location dimension, which specifies North America, South America, Europe, Asia, Africa, and Australia. In this example, the outer dimension is time and the inner dimension is geographic location. Accordingly, if the region was to be divided into sub-regions, then each sub-region would be associated with a same time dimension but a different geographic location (e.g., North America, South America, Europe, Asia, Africa, or Australia).

Continuing with the discussion of FIG. 1C, each sub-region (308) is associated with one or more outer dimensions (302), one or more inner dimensions (304), a distribution key (312), and one or more sets of data (referred to as sub-region data) (314A, 314N), where the data is associated with corresponding revisions map (316A, 316N) (as described above). Additional detail about the designation of a dimension as an inner or outer dimension is provided in FIG. 2. In one embodiment of the invention, the distribution key (312) is generated by applying a function to at least one outer dimension associated with the sub-region. The function may be, for example, a consistent hashing function. The use of the distribution key is described below in FIGS. 2-3G.

In one embodiment of the invention, each dataspace (318) (i.e., a region that only include user data) is associated with a distribution key (320). In one embodiment of the invention, the distribution key (320) is generated by applying a function to at least a dataspace identifier (ID) (which uniquely identifies the dataspace in the query system). The function may be, for example, a consistent hashing function. The use of the distribution key is described below in FIGS. 2-3G.

While the system of FIGS. 1A-1C has been illustrated as including a limited number of components for the sake of brevity, the system may include additional components (not shown), fewer components, and/or different components (not shown) without departing from the invention.

FIGS. 2-3G show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3G may be performed in parallel with any other steps shown in FIGS. 2-3G without departing from the scope of the invention.

FIG. 2 shows a flowchart of a method of configuring the system in accordance with one or more embodiments of the invention. All or a portion of the method shown in FIG. 2 may be performed by one or more of the query nodes and/or another computing device or logical device that is external to the query system.

Turning to FIG. 2, prior to step 200, a data model has been obtained and/or specified. Details about the data model are provided above with respect to FIG. 1C.

In Step 200, the dimensions of the data model are identified. As discussed above, each region is associated with one or more dimensions. Each dimension may specify an item, measure, or characteristic of data that can be obtained, calculated or manipulated. Examples of dimensions may include, but are not limited to, geographic location, time, organization, users, versions, etc. The dimensions may correspond to default dimensions specified by the query system (or by another system or entity) and/or dimensions that are created by users.

In Step 202, the dimensions for the data model are analyzed in order to categorize the dimensions as outer dimensions and inner dimensions. The analysis may include using the data flow graph and the data model to determine the dimensions associated with each region and how data from one region impacts data in another region(s). While the query requests may be processed using a combination of query nodes (see e.g., FIGS. 3A-3G), the query results may be obtained in a more efficient manner if there is less inter-query node communication (i.e., there are fewer query requests issued between the query nodes). Based on the analysis of the data model and the data flow diagram, the dimensions may be categorized in a manner that minimizes or attempts to minimize the inter-query node communication.

Specifically, in one embodiment of the invention, the distribution of sub-regions across the query nodes is based on the outer dimension(s) of the sub-regions. In such implementations, all sub-regions that are associated with the same outer dimension(s) are located on the same query node. Accordingly, based on the data model and the data flow graph, the outer dimension may be specified such that directly related sub-regions (e.g., sub-regions that are connected by an edge in the data flow graph, see e.g., FIG. 4B, sub-region A and sub-region B) are located on the same query node.

Other heuristics and/or analysis may be performed to categorize the dimensions as inner dimensions and outer dimensions without departing from the invention.

Continuing with the discussion of FIG. 2, in Step 204, the data model is divided into sub-regions, where each sub-region is associated with at least one outer dimension and at least one inner dimension. For each sub-region, the value of outer dimension(s) is constant while the inner dimension(s) may vary. For example, if the data model includes the following dimensions: geographic location and time. Based on the analysis in step 202, time may be specified as an inner dimension and geographic location may be specified as an outer dimension. In this example, each sub-region may be associated with a specific value for the outer dimension e.g., North America, South America, Africa, Asia, Europe, or Australia, but be associated with varying values for a time dimension. Accordingly, if sub-region A is associated with an outer dimension of Africa, then all data in this sub-region is associated with the geographic location of Africa but with different time periods (e.g., January, February, March, etc.). The invention is not limited to the aforementioned example.

Continuing with the discussion of FIG. 2, in Step 206, a distribution key is generated for each sub-region (i.e., the sub-regions resulting from Step 204) and each dataspace. Each distribution key may be generated using a function, such as, a consistent hashing function. The distribution keys for each of the sub-regions may be generated using the function with the outer dimension(s) of the sub-regions being used as an input(s) to the function. By using the outer dimension(s) of the sub-regions as the input(s) to the function, all sub-regions with the same outer dimension(s) will have the same value for their distribution key. The distribution keys for each of the dataspaces may be generated using the function with a dataspace identifier (ID) being used as an input to the function.

In Step 208, each of the distribution keys is associated with one of the query nodes. The distribution keys may be spread symmetrically or asymmetrically across the query nodes in order to balance computation across the query system. Any known method or later discovered method may be used to associate keys to particular query nodes without departing from the invention. The result of the process in step 208 is a global distribution key list. This global distribution key list specifies which distribution keys are associated with which query nodes.

In one embodiment of the invention, all distribution keys (i.e., the distribution keys for the sub-regions and the query nodes for the dataspaces) are distributed without regard to whether a given distribution key is associated with a sub-region or a dataspace.

In another embodiment of the invention, distribution keys associated with the sub-regions and the distribution keys associated with the dataspaces are distributed independently. In this scenario, the distribution keys associated with the sub-regions may be rebalanced among the query nodes without changing the manner in which the distribution keys associated with the dataspaces are distributed across the query nodes (and vice versa). Further, in this scenario, the query system may maintain two global distribution key lists—one for sub-regions and one for dataspaces. If two global distribution key lists are maintained, then each query node may also include two node distribution key lists one for sub-regions and one for dataspaces.

In Step 210, one of the query nodes in the query system is designated as the lead query node. The query node, in various implementations of the invention, may include functionality to: (i) send to all query nodes in the query system (or at least to the query nodes that are specified in the global distribution key list(s)) the global distribution key list(s); (ii) update the global distribution key list during the operation of the query system to account for changes in the loads experienced by the various query nodes and/or to address issues (e.g., failures or degraded operation) of one or more of the query nodes and (iii) to propagate updates of the global distribution key list(s) to the various non-leader query nodes. For purposes of this disclosure, each query node maintains its own distribution key list(s) (referred to as a node distribution key list(s)), which is intended to be the same as the global distribution key list(s); however, due to potential latency issues in the propagation of updates to the global distribution key list(s), the node distribution key list(s) on a given query node may be inconsistent (for at least period of time) with the global distribution key list(s). By using the node distribution key lists and maintaining redundant copies of the node distribution key list(s), the query system is not limited to all query nodes attempting to access a single copy of the node distribution key list(s), thereby making the query system fault tolerant. Specifically, if the lead query node fails or becomes unavailable, the query system will continue to operate by (i) designating a new lead query node and (ii) updating the global distribution key list(s) to move all sub-regions or dataspaces that were previously managed by the failed query node to other active query nodes in the query system.

Continuing with the discussion of FIG. 2, after configuration of the query system (e.g., using the method shown in FIG. 2), the query system may service query requests in accordance with FIGS. 3A-3G.

FIGS. 3A-3G show flowcharts for recursively servicing a query request from a client in accordance with one or more embodiments of the invention. All or a portion of the method shown in FIGS. 3A-3G may be performed by one or more of the query nodes. Further, different sets of query nodes in the query system may be concurrently servicing different query requests using the method described in FIGS. 3A-3C.

The method shown in FIG. 3A is from the perspective of the query node that received the query request from a client or the subscription engine. The method shown in FIG. 3B is from the perspective of a query node, which may or may not be query node that received the query request. The method shown in FIG. 3C is from the perspective of other query nodes in the query system that are assisting in servicing the query request but did not receive the initial query request from the client or the subscription engine. The method shown in FIG. 3D is from the perspective of the query node that received the query request from a client or the subscription engine. The method shown in FIG. 3E is from the perspective of other query nodes in the query system that are assisting in servicing the query request but did not receive the initial query request from the client or the subscription engine. The method shown in FIG. 3F is from the perspective of query node that received the query request from a client or the subscription engine. The method shown in FIG. 3G is from the perspective of other query nodes in the query system that are assisting in servicing the query request but did not receive the initial query request from the client or the subscription engine.

Turning to FIG. 3A, in Step 300, a query request is received by the query node. The query request may specify a specific sub-region (referred to as the target sub-region). In this context, the data in the target sub-region corresponds to the data that is being requested via the query request. The query request may, but is not required to, specify a particular version of user data (which may be different per user data) to use to service the query request. If no version of user data is specified (or new version is specified for particular user data), then the query request may use the current version (or the newest version) of such user data to service the query request. The query request may be issued by an entity, where the entity may be client or the subscription engine.

In Step 302, the user data sub-region(s) for the query are determined. More specifically, the data flow graph may be analyzed to determine the underlying user data region(s) that are required to ultimately calculate the data in the target sub-region.

In Step 304, the revisions map for the user data sub-regions is obtained. In one embodiment of the invention, revisions map may be obtained in accordance with FIGS. 3D-3E. Other methods for obtaining the revisions map may be used without departing from the invention.

In one embodiment of the invention, revisions map obtained in step 304 is based on criteria specified by the use (e.g., via a client). The criteria may specify a time, date, or other criterion that may be used to identify a specific version of one or more user data sub-regions. For example, the criteria may specify "January 2018" for user-data sub-region A. In such scenarios, the obtained revisions map specifies a version number for user data sub-region A that corresponds to January 2018. The above example is not intended to limit the scope of the invention.

In Step 306, the input sub-regions for the target sub-region are determined. The input sub-regions correspond to sub-regions, as specified in the data flow graph, which include data (which may be derived data or user data) that is used as input to the target sub-region.

In Step 308, the data is obtained from each of the identified input sub-regions (see e.g., FIG. 3B). The data may be obtained from the cache in the query node, from persistent storage, or from another query node.

In Step 310, one or more functions (e.g., mathematical functions or algorithms) are applied to the data obtained in step 308 is to generate data for the target sub-region. The resulting data is then used to generate a query response, where the query response may include the data associated with the target sub-region.

In Step 312, the query response is provided to entity that issued the query request or to another entity. For example, the query response may be issued to the client that initiated the query request, to the subscription engine that initiated the query request, or to a client where the query request was issued by the subscription engine for the client.

Referring to FIG. 3B, FIG. 3B shows a method for obtaining data from the input sub-regions identified in Step 306. The method shown in FIG. 3B is performed (concurrently, serially, or some combination thereof) for all of the input sub-regions identified in Step 306 or step 352 (below).

Turning to FIG. 3B, in Step 320, an input sub-region is selected. In Step 322, the query node that is managing the selected input sub-region is determined using the node distribution key list on the query node (which may the global distribution key list if the query node is the leader query node). In one embodiment of the invention, the outer dimension(s) of the input sub-region are used as input to a function (e.g., a consistent hashing function) to determine a distribution key for the input sub-region. The node distribution key list on the query node is then queried with the distribution key to identify the query node that is managing the input sub-region.

In Step 324, a determination is made about whether the query node identified in step 322 is the current query node (i.e., the query node that performed step 322). If the query node identified in step 322 is the current query node, then the process proceeds to step 330; otherwise, the current query node is not managing the input sub-region and, as such, the process proceeds to step 326.

In Step 326, the current query node issues a query request to the query node with is identified in step 322. Once the query request is issued, the current query node waits until it receives a response (in step 328) from the query node to which it issued a query request. The query request issued in step 326 specifies the input sub-region and the revisions map (i.e., the revisions map from step 304) (or a portion thereof).

In Step 328, a response to the query request is received, where the response includes the data associated with the selected input sub-region. If the data for the input sub-region is user data, then the received data corresponds to the user data version specified in the revisions map (e.g., if the revisions map specified version 2 of user data for the input sub-region, then the received data is version 2 of the user data) (or a portion thereof). If the data for the input sub-region is derived data, then the received data corresponds to the derived data that is directly or indirectly generated using the user data version specified in the revisions map (e.g., if the revisions map specified version 2 of user data for the input sub-region, then the received data is directly or indirectly derived from version 2 of the user data) (or a portion thereof). The data obtained via the query response may be stored in the cache of the query node along with the corresponding revisions map (or portion thereof). The process then ends.

Referring back from Step 324, if the query node identified in step 322 is the current query node, then in Step 330 a determination is made about whether the correct version of the data associated with the input sub-region is present in the cache. As discussed above, the cache may store multiple versions of data (which may be user data or derived data) for a given sub-region, where each version is associated with a revisions map. Accordingly, the determination in step 330 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 332; otherwise, the process proceeds to step 334.

In Step 332, the correct version of the data associated with the input sub-region is obtained from the cache. The process then ends.

Referred back to Step 330, if the correct version of the data associated with the input sub-region is not present in the cache, then in Step 334 a determination is made about whether the data for the selected input region is user data or derived data. If the data for the selected input region is user data, then the process proceeds to step 336; otherwise, the process proceeds to step 326.

In Step 336, the correct version of the data associated with the input sub-region is obtained. The correct version of the data associated with the input sub-region may be obtained in accordance with FIGS. 3F-3G. Other methods may be used to obtain the correct version of the data associated with the input sub-region without departing from the invention. The process then ends.

Referring to FIG. 3C, FIG. 3C shows a method for servicing inter-query node query requests (i.e., query requests issued in Step 326).

Turning to Step 340, in step 340, a query request is received by a query node from another query node.

In Step 342, a determination is made about whether the correct version of the data associated with the input sub-region is present in the cache. As discussed above, the cache may store multiple versions of data for given sub-region, where each version is associated with a revisions map. Accordingly, the determination in step 342 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 344; otherwise, the process proceeds to step 346.

In Step 344, the correct version of the data associated with the input sub-region is obtained from the cache and then sent back, via a query response, to the query node that issued the query request received in step 340. The process then ends.

Referred back to Step 342, if the correct version of the data associated with the input sub-region is not present in the cache, then in Step 346 a determination is made about whether the data for the selected input region is user data or derived data. If the data for the selected input region is user data, then the process proceeds to step 348; otherwise, the process proceeds to step 350.

In Step 348, the correct version of the data associated with the input sub-region is obtained in accordance with FIGS. 3F-3G. Other methods may be used to obtain the correct version of the data associated with the input sub-region without departing from the invention. The obtained data is then sent back, via a query response, to the query node that issued the query request received in step 340. The data obtained from the persistent storage may be stored in the cache of the query node along with the corresponding revisions map (or portion thereof). The process then ends.

If the data is derived data, then in Step 350, a subsequent input sub-region(s) is determined for the input sub-region specified in the query request obtained in step 340. The subsequent input sub-region corresponds to the sub-region(s), as specified in the data flow graph, which includes data (which may be derived data or user data) that is used an input into the input sub-region. The process then proceeds to step 352.

In Step 352, the data is obtained from each of the identified subsequent input sub-regions (see e.g., FIG. 3B). The data may be obtained from the cache in the query node, from persistent storage, or from another query node. The process then proceeds to step 354.

In Step 354, a query response is generated using the data obtained in steps 352. The query response is then issued to the query node that issue the query request received in step 340.

Referring to FIG. 3D, FIG. 3D shows a method for generating the revisions map that is then used to subsequently service the query request.

In step 360, an unprocessed dataspace associated with the user-data sub-region is selected. For example, if the user-data sub-region identified in step 302 is sub-region A, then the unprocessed dataspace is dataspace A. The query node includes functionality to determine a dataspace associated with the each user-data sub-region identified in step 302.

In step 362, the query node that is managing the selected dataspace is determined using the node distribution key list on the query node (which may the global distribution key list if the query node is the leader query node). In one embodiment of the invention, the dataspace identifier for the selected dataspace is used as input to a function (e.g., a consistent hashing function) to determine a distribution key for the dataspace. The node distribution key list on the query node is then queried with the distribution key to identify the query node that is managing the dataspace.

In step 364, a determination is made about whether the query node identified in step 362 is the current query node (i.e., the query node that performed step 362). If the query node identified in step 362 is the current query node, then the process proceeds to step 366; otherwise, the current query node is not managing the dataspace and, as such, the process proceeds to step 370.

When the current query node is the query node identified in step 362, then in step 366, the query node determines the appropriate version of the user data sub-region using the associated population table. The appropriate version of the user data sub-region may correspond to the most recent version of the data associated with the user data sub-region or to a specific version of data in the user data sub-region.

The following are four examples of using Population Table 1 (above) to determine an appropriate version of the user data sub-region. The example is not intended to limit the scope of the invention.

Population Table Example 1

Consider a scenario in which the most recent version of sub-region A is requested. In this scenario, population table 1 is used to efficiently determine that the most recent version for sub-region A is version 3.

Population Table Example 2

Consider a scenario in which a version of data of sub-region B is requested for T=1. In this scenario, population table 1 is used to efficiently determine that sub-region B was first populated at version 2 (which corresponds to T=2) and, as such, at T=1 there was no data in sub-region B. Accordingly, a version of 0 is returned for sub-region B.

Population Table Example 3

Consider a scenario in which a version of data of sub-region B is requested for T=5. In this scenario, population table 1 is used to efficiently determine that the most recent version for sub-region B is version 3 (which corresponds to T=3). Because version 3 is the most recent version, this means that no other changes since T=3 until T=5 have been made to the data in sub-region. Accordingly, a version of 3 is returned for sub-region B.

Population Table Example 4

Consider a scenario in which a version of data of sub-region A is requested for T=2. In this scenario, by using the population table 1, a determination may be made that the version of data in sub-region A that is to be used is version 2. The result may be version 2 because the first version of data being stored in sub-region A is 1 and the most recent version is 3 and, as such, there is necessarily a version of data for sub-region A at T=2 (i.e., the version of data that was stored at T=1). If version 2 is provided as the appropriate version of sub-region A data to use to service the query request, then when the data for sub-region A is obtained, the appropriate query node may determine that the data corresponding to version 2 is in-fact the data corresponding to version 1 and, as such, the version 1 data for sub-region A is obtained.

Continuing with the discussion of FIG. 3D, in step 368, the revisions map is updated to include the version (e.g., the version number) for the user data sub-region determined in step 366 or obtained in the revisions map response received in step 372. The process then proceeds to step 374.

Returning back to step 364, when the current query node is not managing the dataspace, then in step 370, the current query node issues a revision map request to the query node with is identified in step 362. Once the revision map request is issued, the current query node waits until it receives a revision map response (in step 372) from the query node to which it issued a revision map request. The revision map request issued in step 370 may specify the user-data sub-region and, optionally, criteria provided by user (as described in step 304).

In step 372, a revisions map response to the revisions map request is received, where the revisions map response includes a version (which may be a number) of the user data sub-region to use to service the query request. The process then proceeds to step 368.

In step 374, a determination is made about whether there are any remaining unprocessed dataspaces. If there are any remaining unprocessed dataspaces, the process proceeds to step 360; otherwise, the process ends. While FIG. 3D describes processing the dataspaces in a serial manner, the dataspaces may be processed in parallel without departing from the invention.

Referring to FIG. 3E, FIG. 3E shows a method for processing a revisions map request. In step 380, the revisions map request is received from another query node (i.e., the query node that performed step 370 in FIG. 3D).

In step 382, the query node determines the appropriate version of the user data sub-region using the associated population table. The appropriate version of the user data sub-region may correspond to the most recent version of the data associated with the user data sub-region or to a specific version of data in the user data sub-region. Step 382 may be performed as described above with respect to step 366.

In step 384, a revisions map response is generated and issued to the query node from the revisions map request was received. The revisions map response includes the version (e.g., the version number) for the user data sub-region determined in step 382. The process then ends.

Referring to FIG. 3F, FIG. 3F shows a method for obtaining user data. In step 390, the query node that is managing the dataspace associated with the user data sub-region is determined using the node distribution key list on the query node (which may be the global distribution key list if the query node is the leader query node). In one embodiment of the invention, the dataspace identifier for the selected dataspace is used as input to a function (e.g., a consistent hashing function) to determine a distribution key for the dataspace. The node distribution key list on the query node is then queried with the distribution key to identify the query node that is managing the dataspace.

In step 392, a determination is made about whether the query node identified in step 390 is the current query node (i.e., the query node that performed step 390). If the query node identified in step 390 is the current query node, then the process proceeds to step 394; otherwise, the current query node is not managing the dataspace and, as such, the process proceeds to step 414.

In step 394, a determination is made about whether the sub-regions associated with the dataspace are sharded in the same way as the input sub-region. Said another way, do the sub-regions associated with the dataspace have the same inner and outer dimensions as the input sub-region. If the sub-regions associated with the dataspace are sharded in the same way as the input sub-region, then the process proceeds to step 400; otherwise the process proceeds to step 396. The process may proceed to step 396 when either: (i) there is no data for the dataspace on the query node or (ii) if there are differently sharded sub-regions for the dataspace on the query node.

In step 396, all of the unsharded user data up to the correct version of the user data (i.e., the version of the user-data sub-region specified in the revisions map) is obtained from persistent storage (e.g., FIG. 1, 110) via the DBMS (e.g., FIG. 1, 108).

In step 398, new sub-regions for the dataspace are created, where the sub-regions have the same inner and outer dimensions as the input sub-region (i.e., the dataspace is sharded in the same way as the input sub-region). The process then proceeds to step 408.

Returning to step 394, when the sub-regions associated with the dataspace are sharded in the same way as the input sub-region, then in step 400, a determination is made about whether the input sub-region is populated. The determination is step 400 may be performed using the data population table (as discussed above). If the input sub-space is not populated (e.g., it has a version 0 specified in the population table), then the process proceeds to 402; otherwise, the input sub-region includes data and the process proceeds to step 404.

In step 402, an indication that the input sub-region has no data or that the data in the input sub-region is zero. The indication may be flag or other notation that allows the query node to readily determine that there is no data in the input sub-region. This indication may be used to limit the computations that need to be performed using the input sub-region. For example, if the data in the input sub-region is to be combined with data from another input sub-region using a multiplication operation, then an indication that there is no data in the input sub-region may allow the query node to specify the result value of the multiplication operation is zero without requiring any additional computations or processing. Continuing with the discussion of FIG. 3F, after step 402, the process ends.

Returning to Step 400, when the sub-region is populated, then in step 404 a determination is made about whether user data is required from persistent storage. As discussed above, the revisions map specifies the correct version of the data for the input sub-region that is required. Accordingly, if this version of the data is not stored on the query node (either in the cache or in local storage on the query node), then the process proceeds to step 406; otherwise, the version of the data is present on the query node and the process proceeds to step 416.

When the version of the data for the sub-region is not on the query node, then in step 406, either: (i) the specific version of data that is required is retrieved from the persistent storage (e.g., FIG. 1, 110) via the DBMS (e.g., FIG. 1, 108) or (ii) all versions of data from the version that is current stored up to the correct version of data is retrieved from the persistent storage.

In step 408, the unsharded data received in step 398 or 406 is processed such that each piece of data that is received is associated with the appropriate sub-region of the dataspace. Associating the data with the appropriate sub-region includes storing the data along with information about its version.

In step 410, the population table for the data space is optionally updated. The population table may be updated when (i) a first version of data is associated with a particular sub-region or (ii) a most recent version of data is associated with a particular sub-region. The process then proceeds to step 416.

In step 412, when the current query node is not managing the dataspace, then in step 412, the current query node issues a user data request to the query node which was identified in step 390. Once the user data request is issued, the current query node waits until it receives a user data response (in step 414) from the query node to which it issued a user data request. The user data request issued in step 412 may specify the input sub-region and the revisions map (or the portion that specifies which version of data is being requested for the input sub-region).

In step 414, a user data response to the user data request is received, where the user data response includes the request version of user data for the input sub-region or an indication that there is no user data associated with the input sub-region to use to service the query request. The process then proceeds to step 416.

In step 416, the user data associated with the input sub-region (i.e., the input sub-region specified in step 320) is cached in the query node. If the process shown in FIG. 3F is performed in response to step 348, the user data associated with the input sub-region (or an indication that there is no user data in the input sub-region) is transmitted to the query node that issued the query request in step 326.

Referring to FIG. 3G, FIG. 3G shows a method for servicing a user data request. In step 420, a user data request is received from a query node (i.e., the query node that issued the user data request in step 412).

In step 422, a determination is made about whether the sub-regions associated with the dataspace are sharded in the same way as the input sub-region. Said another way, do the sub-regions associated with the dataspace have the same inner and outer dimensions as the input sub-region. If the sub-regions associated with the dataspace are sharded in the same way as the input sub-region, then the process proceeds to step 428; otherwise the process proceeds to step 424. The process may proceed to step 424 when either (i) there is no data for the dataspace on the query node or (ii) if there are differently sharded sub-regions for the dataspace on the query node.

In step 424, all of the unsharded user data up to the correct version of the user data (i.e., the version of the user-data sub-region specified in the revisions) is obtained from persistent storage (e.g., FIG. 1, 110) via the DBMS (e.g., FIG. 1, 108).

In step 426, new sub-regions for the dataspace are created, where the sub-regions have the same inner and outer dimensions as the input sub-region (i.e., the dataspace is sharded in the same way as the input sub-region). The process then proceeds to step 434.

Returning to step 422, when the sub-regions associated with the dataspace are sharded in the same way as the input sub-region, then in step 428, a determination is made about whether the input sub-region is populated. The determination is step 428 may be performed using the data population table (as discussed above). If the input sub-space is not populated (e.g., it has a version 0 specified in the population table), then the process proceeds to 438; otherwise, the input sub-region includes data and the process proceeds to step 430.

Returning to Step 428, when the sub-region is populated, then in step 430 a determination is made about whether user data is required from persistent storage. As discussed above, the revisions map specifies the correct version of the data for the input sub-region that is required. Accordingly, if this version of the data is not stored on the query node (either in the cache or in local storage on the query node), then the process proceeds to step 432; otherwise, the version of the data is present on the query node and the process proceeds to step 438.

When the version of the data for the sub-region is not on the query node, then in step 432, either: (i) the specific version of data that is required is retrieved from the persistent storage (e.g., FIG. 1, 110) via the DBMS (e.g., FIG. 1, 108) or (ii) all versions of data from the version that is current stored up to the correct version of data is retrieved from the persistent storage.

In step 434, the unsharded data received in step 426 or 432 is processed such that each piece of data that is received is associated with the appropriate sub-region of the dataspace. Associating the data with the appropriate sub-region includes storing the data along with information about it version.

In step 436, the population table for the data space is optionally updated. The population table may be updated when (i) a first version of data is associated with a particular sub-region or (ii) a most recent version of data is associated with a particular sub-region. The process then proceeds to step 438.

In step 438, the user data associated with the input sub-region (i.e., the input sub-region specified in step 320) is cached in the query node. In addition, a user data response that includes the user data associated with the input sub-region (or an indication that there is no user data in the input sub-region) is generated and transmitted to the query node that issued the user data request in step 412.

EXAMPLE

FIGS. 4A-4G shows an example in accordance with one or more embodiments of the invention. The following example is used to illustrate the servicing of a query request in accordance with FIGS. 4A-4G but is not intended to limit the scope of the invention.

Figure 4A:
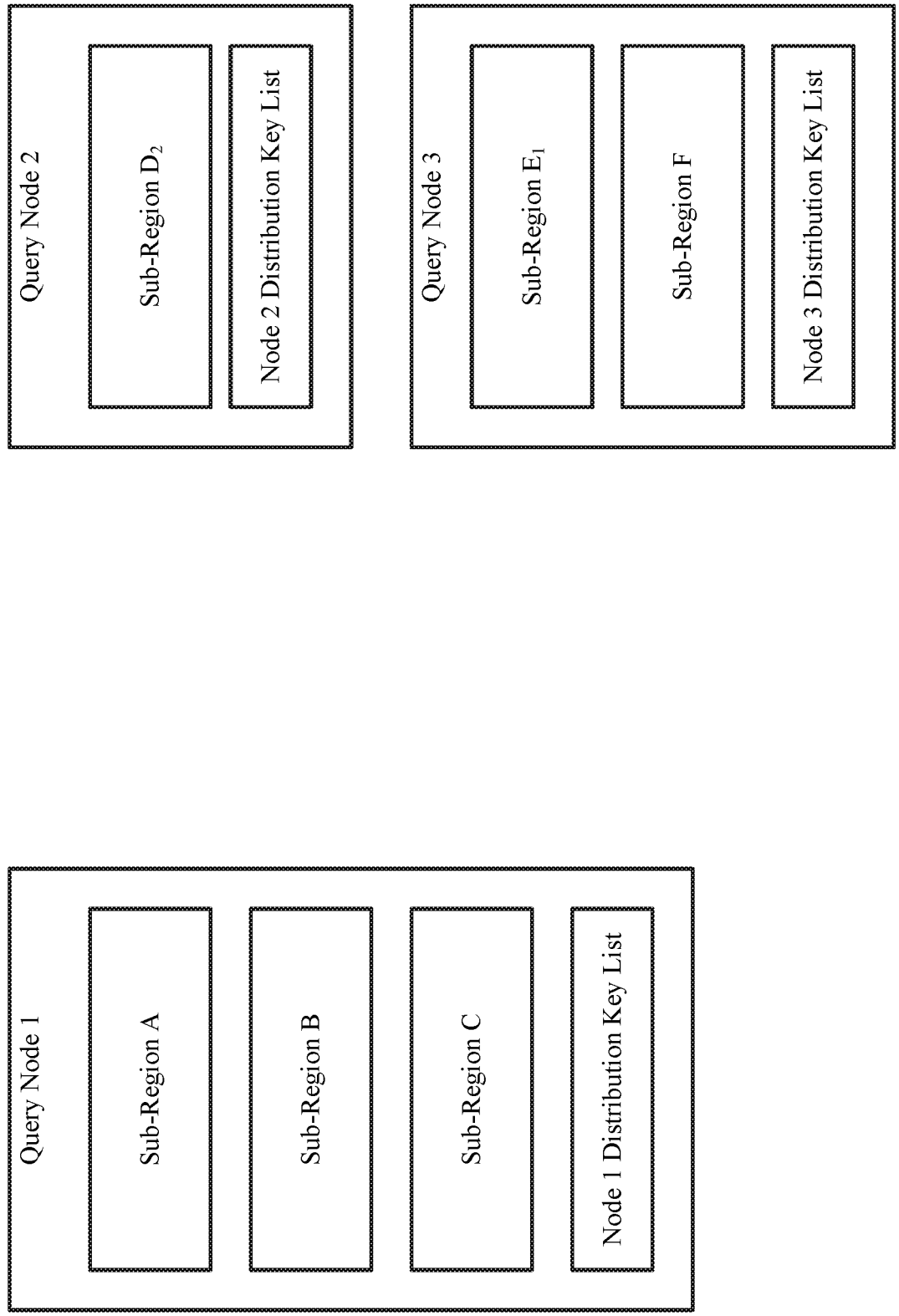

Referring to FIG. 4A, consider a scenario in which the query system includes three query nodes, namely, query node 1, query node 2, and query node 3. Further, the data model is divided, in accordance with the method shown in FIG. 2, into six sub-regions, namely, sub-region A (SRA), sub-region B (SRB), sub-region C (SRC), sub-region $D_2$ (SRD), sub-region $E_1$ (SRE), and sub-region F (SRF). In this example, the sub-regions are distributed across the query nodes as follows: query node 1 manages SRA, SRB, and SRC; query node 2 manages SRD, and query node 3 manages SRE, and SRF. Each of the query nodes includes its own node distribution key list, which specifies which query node manages each of the aforementioned sub-regions.

Figure 4B:
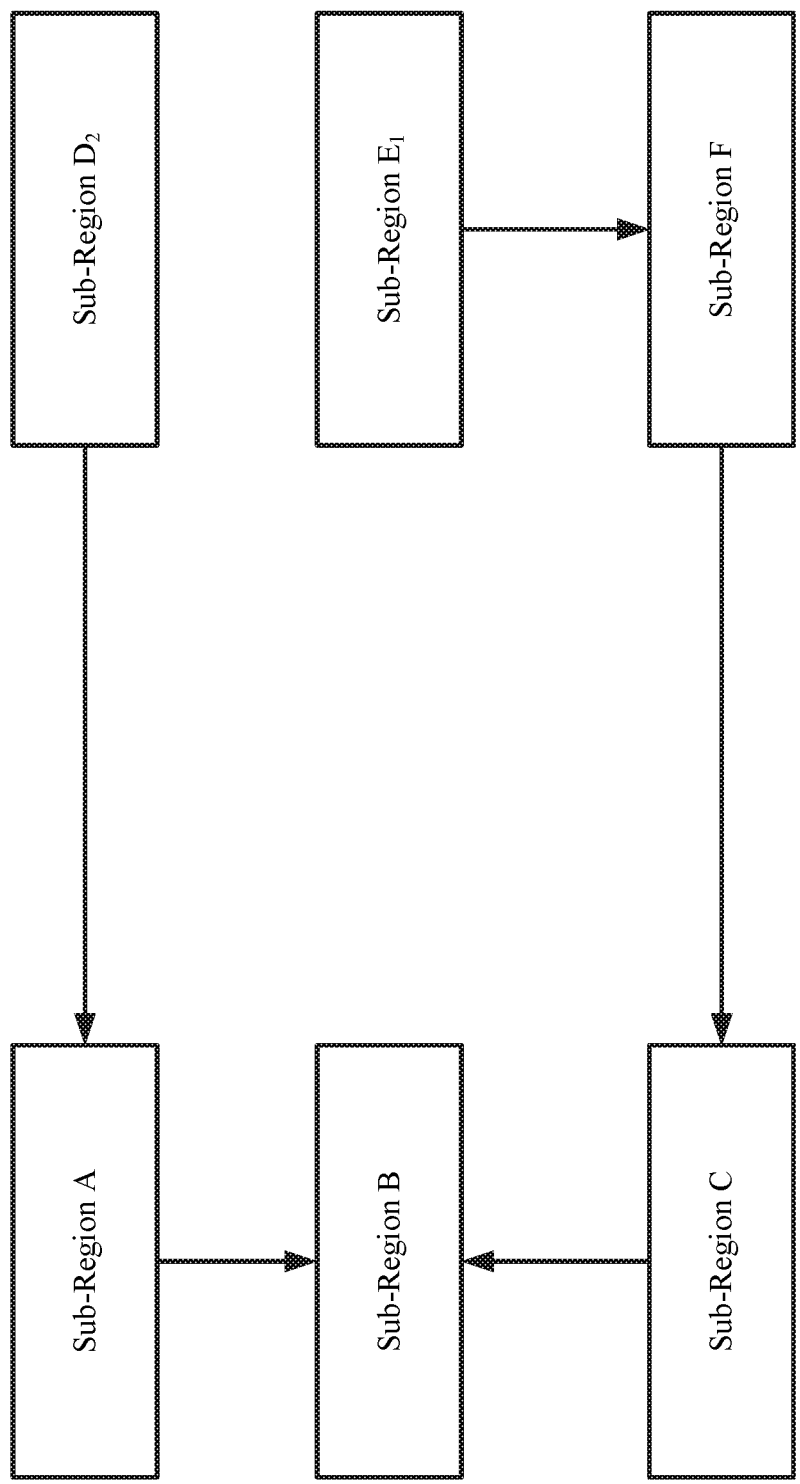

Referring to FIG. 4B, FIG. 4B shows a data flow graph depicting the relationship between the aforementioned sub-regions. Specifically, in this example, SRA, SRB, SRC, and SRF are sub-regions that include derived data while sub-regions SRD and SRE include user data. Further, the input sub-region for SRF is SRE, the input sub-region for SRA is SRD, the input sub-region for SRC is SRF, and the input sub-regions for SRB are SRA and SRC.

Figure 4C:
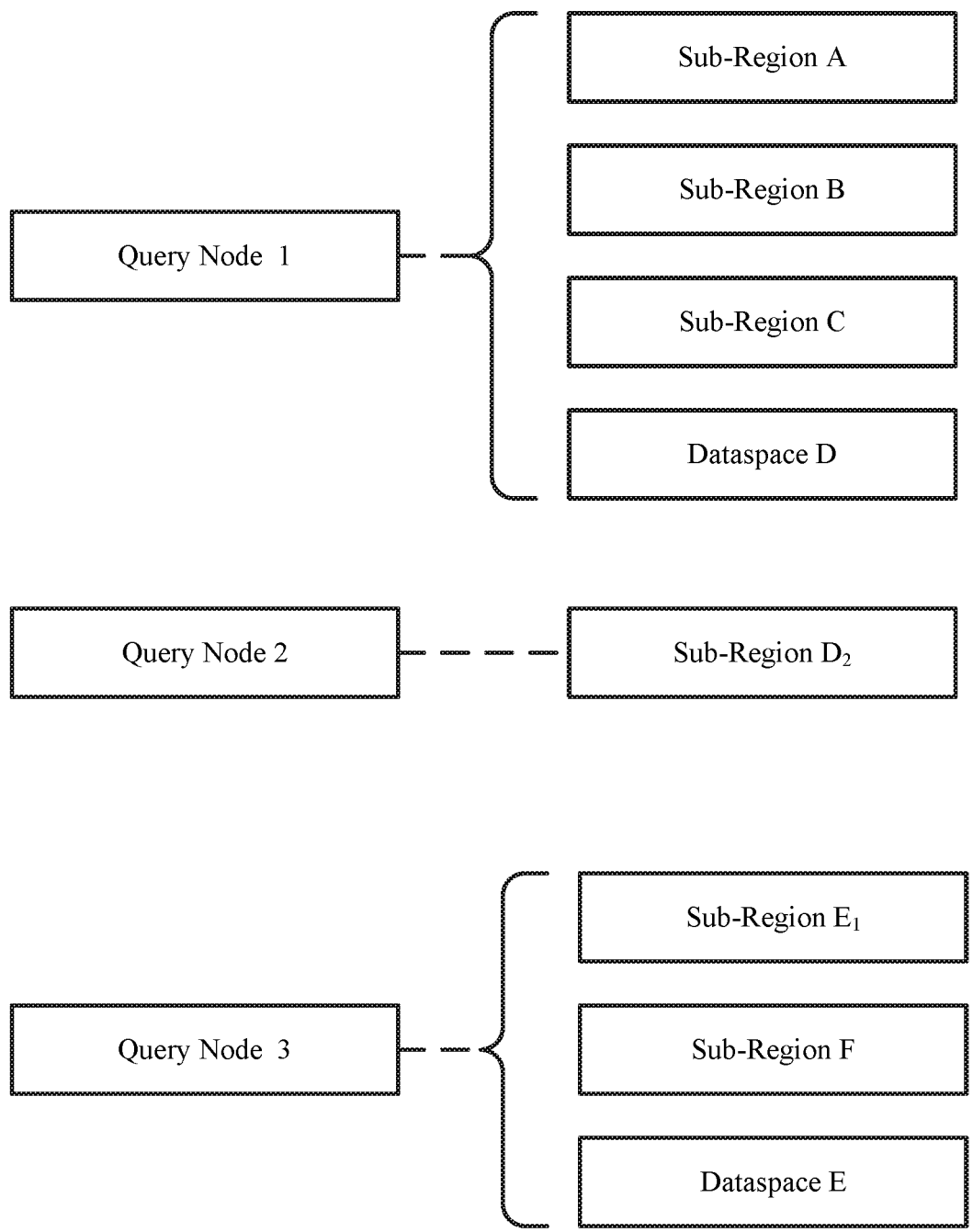
Figure 4D:
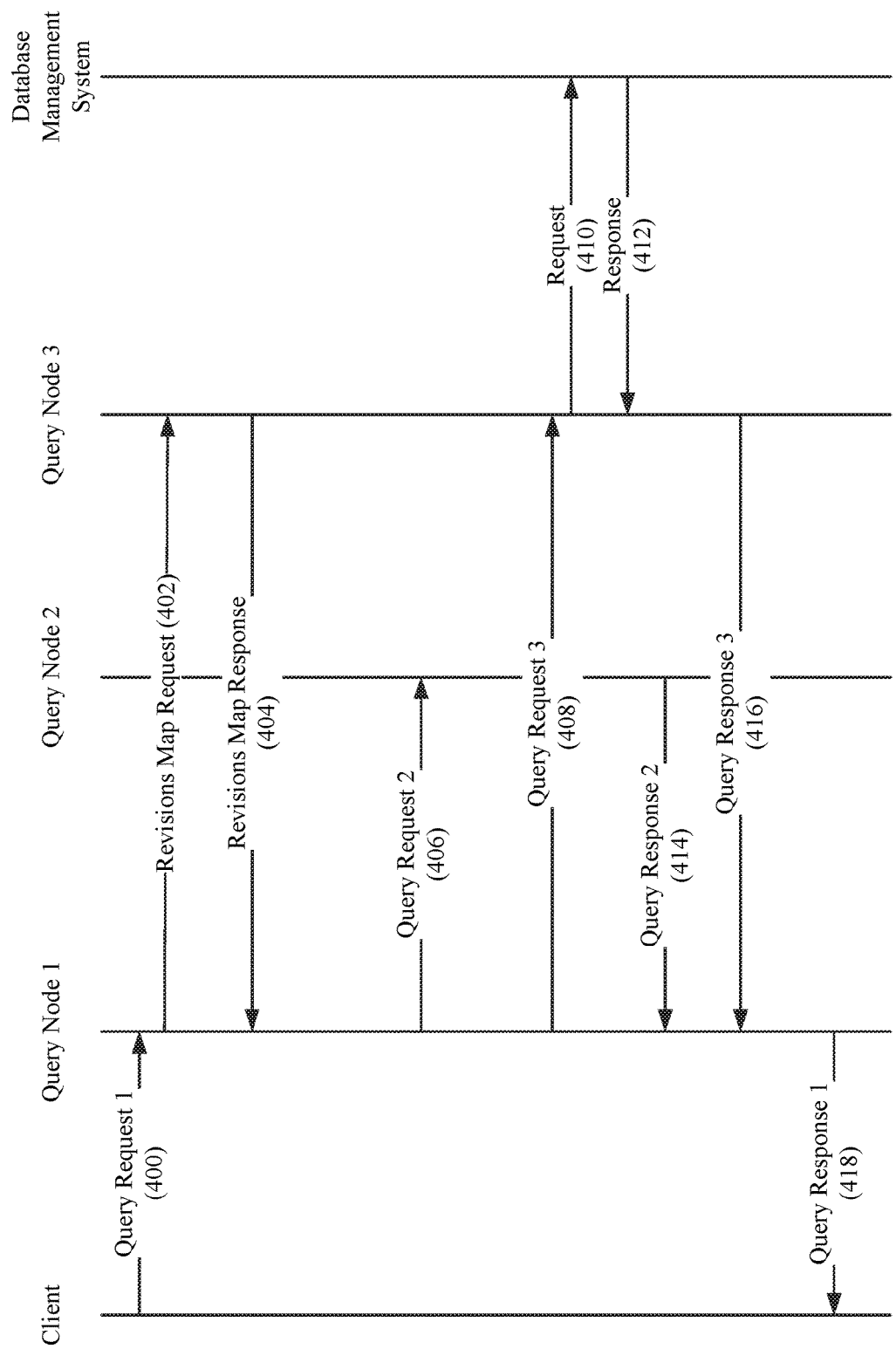
Figure 4E:
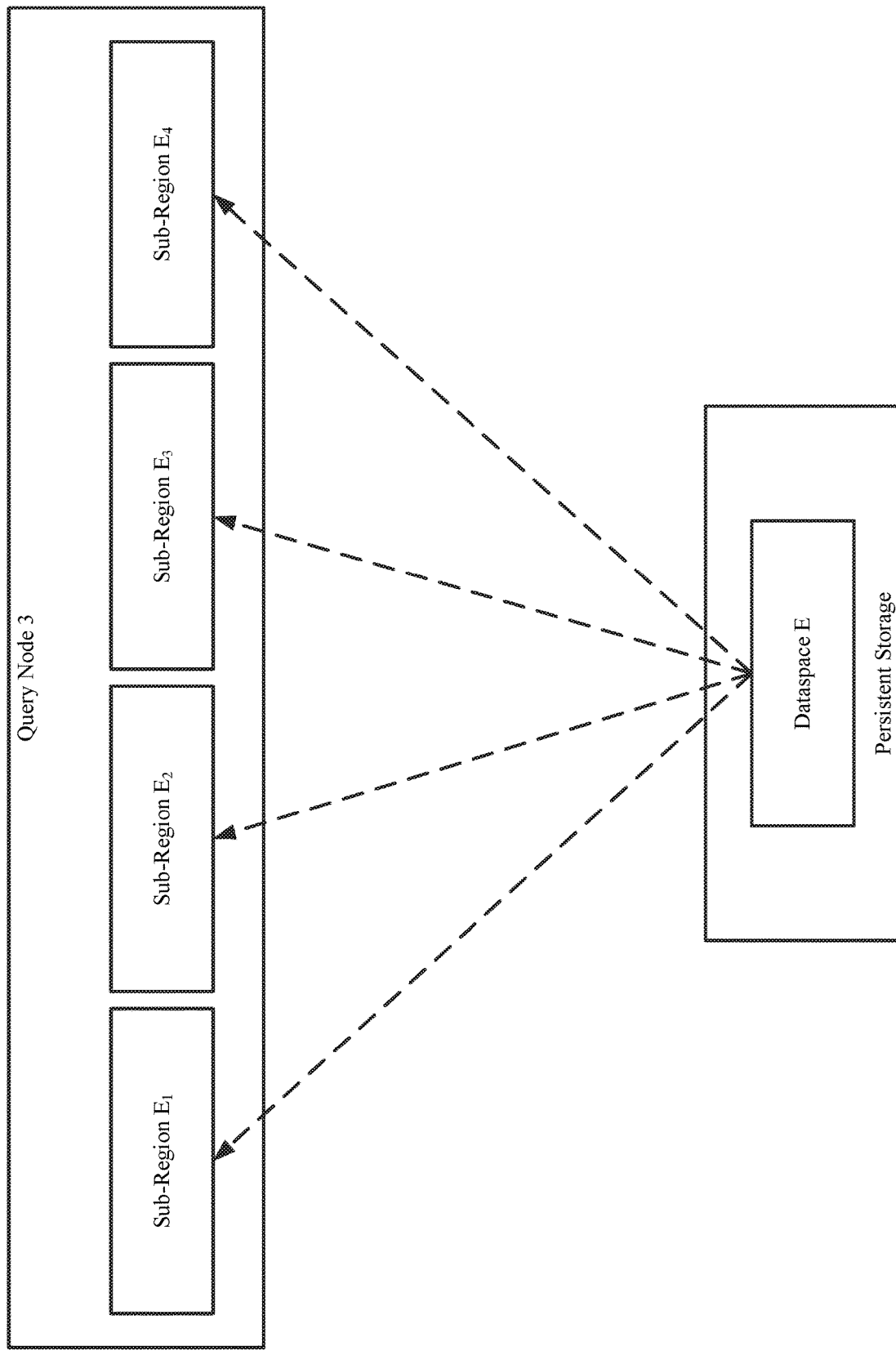

Referring to FIG. 4C, consider a scenario in which a client issues query request 1 (400) to query node 1. Query request 1 specifies a target sub-region as SRB but does not specify any specific version of user data to use for servicing the query request. Accordingly, a recent version (which may be the most current version) of user data is used as, in this example, the default version of user data is used when no specific version of the user data is specified.

Query node 1, using the data flow graph (see e.g., FIG. 4B) determines that the user data sub-regions associated with SRB are SRD and SRE. In response to this determination, query node 1, which the managing dataspace D (see FIG. 4C), determines using the method shown in FIG. 3D and the population table for Dataspace D (see e.g., FIG. 4F), that the version for SRD is SRDv3

Further, for SRE, query node 1, using the method shown in FIG. 3D, determines that dataspace E is managed by query node 3 (see FIG. 4C). In response to this determination, query node 1 issues a revisions map request (402) to the query node 3 Management System (DBMS) for the current version of user data associated with SRE. The query node 3 performs the method shown in FIG. 3 and determines, using the population table for dataspace E (see e.g., FIG. 4F) that the version for SRE is SREv6. Query node 3 subsequently generates and send a revisions map response (404) to query node 1 with this information.

Query node 1 then determines that the input sub-regions for SRB are SRA and SRC. For SRA, the query node determines that SRA is managed by query node 1 using the node 1 distribution key list and a distribution key for SRA. As SRA is managed by query node 1, the cache on query node 1 is searched to determine whether it includes data for SRA that is associated with SRDv3. In this example, the cache does not include this data. Accordingly, query node 1 subsequently determines that the input sub-region for SRA is SRD. In response to this determination, query node 1 calculates a distribution key for SRD using the outer dimension of SRD. The node 1 distribution key list in combination with the distribution key for SRD is used to identify that query node 2 manages SRD. Accordingly, query node 1 issues query request 2 (406) to query node 2 for the data in SRD associated with SRDv3.

For SRC, the query node 2 determines that SRC is managed by query node 1 using the node 1 distribution key list and a distribution key for SRC. As SRC is managed by query node 1, the cache on query node 2 is searched to determine whether it includes data for SRC that is associated with SREv6. In this example, the cache does not include this data. Accordingly, query node 1 subsequently determines that the input sub-region for SRC is SRF. In response this determination, query node 2 calculates a distribution key for SRF using the outer dimension of SRF. The node 2 distribution key list in combination with the distribution key for SRF is used to identify that query node 3 manages SRF. Accordingly, query node 2 issues query request 3 (408) to query node 3 for the data in SRF associated with SREv6. While steps 406 and 408 are described as being performed sequentially in this example, they may also be performed in parallel.

Query node 3 subsequently receives query request 3 (408). Query node 3 determines that the cache on query node 3 does not include data for SRF that is associated with SREv6 and that the input sub-region for SRF is SRE. In response to the two aforementioned determinations, query node 3 calculates a distribution key for SRE using the outer dimension of SRE. The node 3 distribution key list in combination with the distribution key for SRE is used to identify that query node 3 manages SRE.

Based on this determination, query node 3 searches the cache on query node 3 to determine whether data for SRE associated with SREv6 is present in the cache. In this example, the data for SRE associated with SREv6 is not present in the cache and, as a result, query node 3 performs the method shown in FIG. 3E.

Referring to FIG. 3E, in performing the method shown in FIG. 3E, query node 3 issues a request (410) to the DBMS to obtain all data for dataspace E and receives unsharded data for dataspace E in response (412). Query node 3 subsequently shards dataspace E into four sub-regions namely, $E_1$, $E_2$, $E_3$, and $E_4$. The obtained data for dataspace E is then processed with each piece of datum being associated with one of the aforementioned sub-regions. The data for SRE (i.e., sub-region $E_1$) along with the following revisions map [SREv6] is stored in the cache on query node 3.

At some later point in time, query node 2 obtains data for SRD associated with SREv3 from its cache and transmits the data (via query response 2 (414)) to query node 1. Further, query node 3 generates data for SRF using the data for SRE associated with [SREv6] and transmits the generated data (via query response 3 (416)) to query node 1.

Upon receipt of query response 2, query node 1 generates data for SRA using the data for SRD associated with [SRDv3] and upon receipt of query response 3, query node 1 generates data for SRC using the data for SRF associated with [SREv6]. The newly generated data for SRA (with an association to SRDv3) and SRC (with an association to SREv6) is cached in query node 1.

Finally, the generated data for SRA and SRC is used to generate the data for SRB. The resulting data for SRB is then transmitted to the client via query response 1. SRB is also cached and associated with [SRDv3, SREv6].

End of Example

Figure 5:
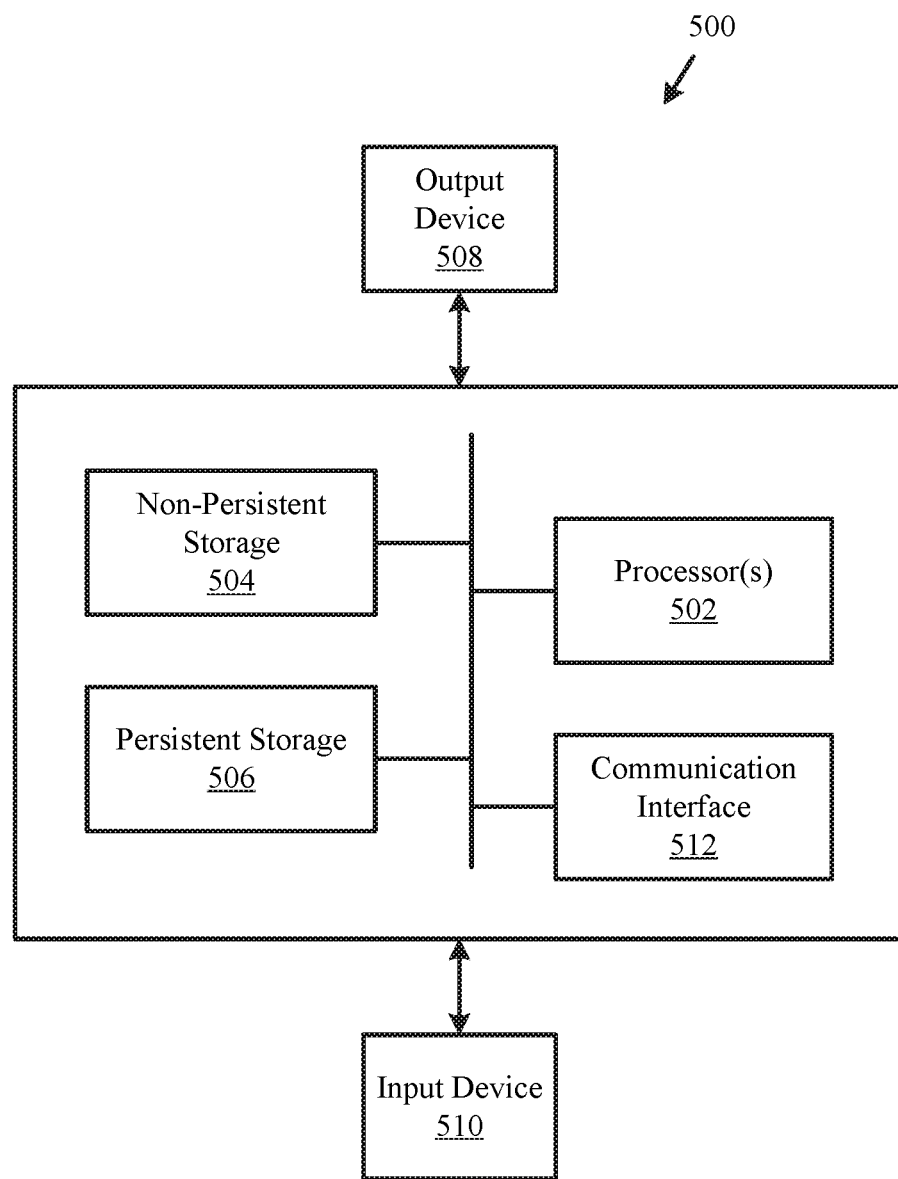
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve data processing technology for very large data sets. Specifically, embodiments of the invention may improve the processing by, for example: (i) only requiring user data to be stored in persistent storage as opposed to requiring all derived data to be stored in persistent storage thereby reducing the amount of persistent storage required to implement the query system; (ii) implementing a query system that only requires derived data to be calculated in response to a query request as instead of updating the derived data each time there is an updated to any user data thereby reducing the computing overhead required in query systems in which user data is frequently updated; and (iii) by using strong versioning and a data flow graph that specifies the relationships between sub-regions, a consistent query result may be generated for a given target region using a specific revisions map.

The improvement to the data processing technology by various embodiments of the invention discussed above should be understood as being examples of improvements to the technology and should not be limit the invention is any manner.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for servicing query requests from at least one client by a query system, wherein the query system comprises a plurality of query nodes, the method comprising:
   making a first determination, by a query node of the plurality of query nodes, that it is associated with a dataspace,
      wherein the dataspace is a region including one or more versions of user data,
      wherein the user data includes a plurality of attributes comprising at least a first attribute and a second attribute, wherein the first attribute includes at least one unique first sub-attribute and the second attribute comprises a plurality of unique second sub-attributes;
   making, by the query node, a second determination that user data associated with a first input sub-region is not present on the query node, wherein the first input sub-region is associated with the dataspace;
   based on the first determination and the second determination, obtaining, by the query node, the user data for the dataspace from persistent storage;
   dividing the obtained user data based on the plurality of unique second sub-attributes to obtain a plurality of sub-regions,
      wherein each of the plurality of sub-regions comprises a portion of the obtained user data,
      wherein a sub-region of the one of the plurality of sub-regions corresponds to the first input sub-region,
      wherein each of the plurality of sub-regions includes an outer dimension and an inner dimension,
      wherein the outer dimension is based on the first attribute and each of the plurality of sub-regions is based on a same one of the at least one first sub-attribute, and
      wherein the inner dimension is based on the second attribute and each of the plurality of sub-regions is based on a different one of the unique second sub-attributes of the second attribute;
   associating at least a portion of the obtained user data in the sub-region of the plurality of sub-regions with the first input sub-region to obtain a populated first input sub-region,
   servicing, by the query node, a query request using a populated first input sub-region, wherein the populated first input sub-region comprises data associated with one of the plurality of sub-regions;
   making a third determination by the query node that it is not associated with a second dataspace and that a second query node is associated with the second dataspace;
   based on the third determination, issuing by the query node to the second query node, a user data request to the second query node;
   receiving, from the second query node, a user data response in response to the user data request, wherein the user data response comprises user data that is used to obtain a populated second input sub-region on the query node; and
   servicing, by the query node, a second query request using the populated second input sub-region.

2. The method of claim 1, wherein at least a portion of the populated first input sub-region is stored in a cache on the query node.

3. The method of claim 2, wherein the populated first input sub-region comprises a first version of user data for the first input sub-region and a second version of user data for the first input sub-region.

4. The method of claim 3, wherein only the second version of the user data for the first input sub-region is stored in the cache.

5. The method of claim 1, further comprising:
   receiving, by the query node, additional user data associated with the dataspace from the persistent storage; and
   associating at least a portion of the additional user data with the populated first input sub-region to obtain an updated populated first sub-region.

6. The method of claim 1, further comprising:
   associating at least a second portion of the obtained user data with a second input sub-region to obtain a populated second input sub-region,
   wherein the second input sub-region is associated with the dataspace;
   wherein there is no overlap of data between the first input sub-region and the second input sub-region.

7. The method of claim 1, wherein making the first determination comprises using a distribution key and a node distribution key list to identify the query node as being associated with the dataspace, wherein the distribution key is associated with the sub-region of the plurality of sub-regions, wherein the distribution key is generated by applying a function to the outer dimension associated with the sub-region.

8. The method of claim 1, wherein making the first determination comprises using a distribution key and a node distribution key list to identify the query node as being associated with the dataspace, wherein the distribution key is a value generated using consistent hashing and a dataspace identifier for the dataspace.

9. The method of claim 1, wherein making the second determination comprises determining that user data associated with the first input sub-region is present on the query node, that the associated user data is for a second version of data associated with the first input sub-region, and that the query request requires a first version of data associated with the first input sub-region.

10. A non-transitory computer readable medium comprising computer readable program code, which when executed by a computer processor enables the computer processor to perform a method for servicing query requests, from at least one client by a query system, wherein the query system comprises a plurality of query nodes, the method comprising:
   making a first determination, by a query node of the plurality of query nodes, that it is associated with a dataspace,
      wherein the dataspace is associated with one or more versions of user data,
      wherein the user data includes a plurality of attributes comprising at least a first attribute and a second attribute, wherein the first attribute includes at least one unique first sub-attribute and the second attribute comprises a plurality of unique second sub-attributes, making, by the query node, a second determination that user data associated with a first input sub-region is not present on the query node, wherein the first input sub-region is associated with the dataspace;

based on the first determination and the second determination, obtaining, by the query node, the user data for an entire dataspace from persistent storage;

dividing the obtained user data based on the plurality of unique second sub-attributes to obtain a plurality of sub-regions,
- wherein each of the plurality of sub-regions comprises a portion of the obtained user data,
- wherein a sub-region of the one of the plurality of sub-regions corresponds to the first input sub-region,
- wherein each of the plurality of sub-regions includes an outer dimension and an inner dimension,
- wherein the outer dimension is based on the first attribute and each of the plurality of sub-regions is based on a same one of the at least one first sub-attribute, and
- wherein the inner dimension is based on the second attribute and each of the plurality of sub-regions is based on a different one of the unique second sub-attributes of the second attribute;

associating at least a portion of the obtained user data in the sub-region with the first input sub-region to obtain a populated first input sub-region;

servicing, by the query node, a query request using a populated first input sub-region, wherein the populated first input sub-region comprises data associated with one of the plurality of sub-regions;

making a third determination by the query node that it is not associated with a second dataspace and that a second query node is associated with the second dataspace;

based on the third determination, issuing by the query node to the second query node, a user data request to the second query node;

receiving, from the second query node, a user data response in response to the user data request, wherein the user data response comprises user data that is used to obtain a populated second input sub-region on the query node; and servicing, by the query node, a second query request using the populated second input sub-region.

11. The non-transitory computer readable medium of claim 10, wherein the populated first input sub-region comprises a first version of the user data for the first input sub-region and a second version of the user data for the first input sub-region.

12. The non-transitory computer readable medium of claim 11, wherein only the second version of the user data for the first input sub-region is stored in a cache on the query node.

13. The non-transitory computer readable medium of claim 10, wherein the method further comprises:
- receiving, by the query node, additional user data associated with the dataspace from the persistent storage; and
- associating at least a portion of the additional user data with the populated first input sub-region to obtain an updated populated first sub-region.

14. The non-transitory computer readable medium of claim 10, wherein the method further comprises:
- associating at least a second portion of the obtained user data with a second input sub-region to obtain a populated second input sub-region,
- wherein the second input sub-region is associated with the dataspace;
- wherein there is no overlap of the user data between the first input sub-region and the second input sub-region.

15. The non-transitory computer readable medium of claim 10, wherein making the second determination comprises determining that user data associated with the first input sub-region is present on the query node, that the associated user data is for a second version of data associated with the first input sub-region, and that the query request requires a first version of the user data associated with the first input sub-region.

* * * * *